United States Patent
Yamasaki

(10) Patent No.: US 9,291,803 B2
(45) Date of Patent: Mar. 22, 2016

(54) ZOOM LENS AND IMAGE PICKUP APPARATUS INCLUDING THE SAME

(71) Applicant: CANON KABUSHIKI KAISHA, Tokyo (JP)

(72) Inventor: Shinji Yamasaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 13/866,746

(22) Filed: Apr. 19, 2013

(65) Prior Publication Data
US 2013/0278814 A1    Oct. 24, 2013

(30) Foreign Application Priority Data

Apr. 24, 2012 (JP) .................................. 2012-098676

(51) Int. Cl.
*G02B 15/14* (2006.01)
*G02B 27/64* (2006.01)
*G02B 15/173* (2006.01)

(52) U.S. Cl.
CPC .............. *G02B 15/14* (2013.01); *G02B 15/173* (2013.01); *G02B 27/646* (2013.01)

(58) Field of Classification Search
CPC ........ G02B 15/00; G02B 15/14; G02B 15/15; G02B 15/16; G02B 15/163; G02B 15/167; G02B 15/173; G02B 15/20; G02B 15/22; G02B 15/24; G02B 15/28; G02B 27/64; G02B 27/646
USPC .......................... 359/554, 557, 676, 686–687
See application file for complete search history.

(56) References Cited

U.S. PATENT DOCUMENTS

| | | | | |
|---|---|---|---|---|
| 5,828,499 A | * | 10/1998 | Ohtake | 359/676 |
| 7,515,354 B2 | * | 4/2009 | Miyajima | 359/690 |
| 2008/0112062 A1 | * | 5/2008 | Miyajima | 359/687 |
| 2009/0040625 A1 | * | 2/2009 | Shinohara et al. | 359/687 |
| 2011/0002049 A1 | | 1/2011 | Matsumura et al. | |
| 2011/0176225 A1 | | 7/2011 | Shinohara et al. | |
| 2012/0113527 A1 | * | 5/2012 | Horiuchi | 359/687 |
| 2013/0278814 A1 | * | 10/2013 | Yamasaki | 348/345 |

FOREIGN PATENT DOCUMENTS

| | | |
|---|---|---|
| CN | 101363955 A | 2/2009 |
| CN | 102129118 A | 7/2011 |
| CN | 102466873 A | 5/2012 |
| JP | 8082743 A | 3/1996 |
| JP | H08-211290 A | 8/1996 |
| JP | 2000-231050 A | 8/2000 |

\* cited by examiner

*Primary Examiner* — Thong Nguyen
(74) *Attorney, Agent, or Firm* — Canon USA Inc. IP Division

(57) ABSTRACT

A zoom lens includes, in order from an object side toward an image side, a first lens unit having a positive refractive power, a second lens unit having a negative refractive power, a third lens unit having a positive refractive power, and a fourth lens unit having a positive refractive power. The second lens unit, the third lens unit, and the fourth lens unit are moved during zooming. A position of the third lens unit at a telephoto end is closer to the object side than a position of the third lens unit at a wide-angle end. The focal length of the zoom lens at the wide-angle end, the difference in the position of the second lens unit on an optical axis between that at the wide-angle end and that at the telephoto end, and the focal length of the second lens unit are set appropriately.

8 Claims, 25 Drawing Sheets

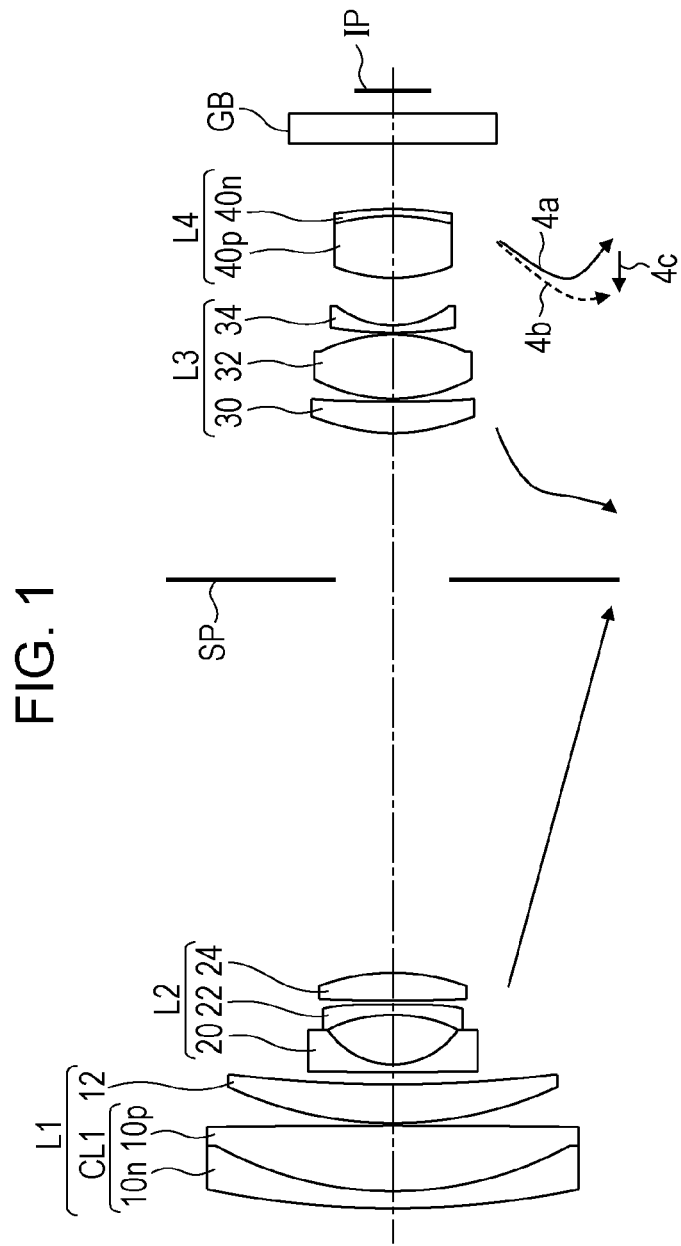

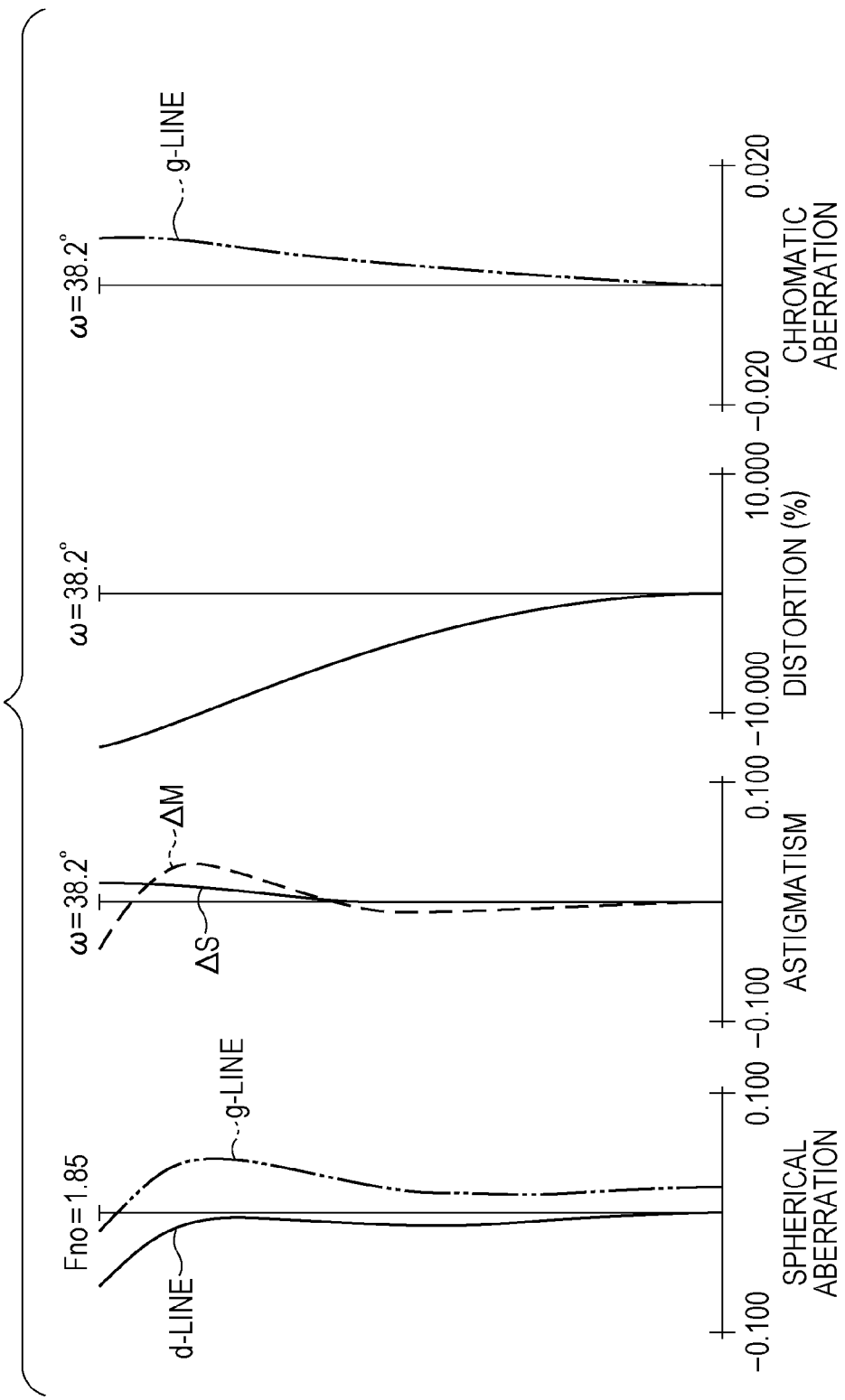

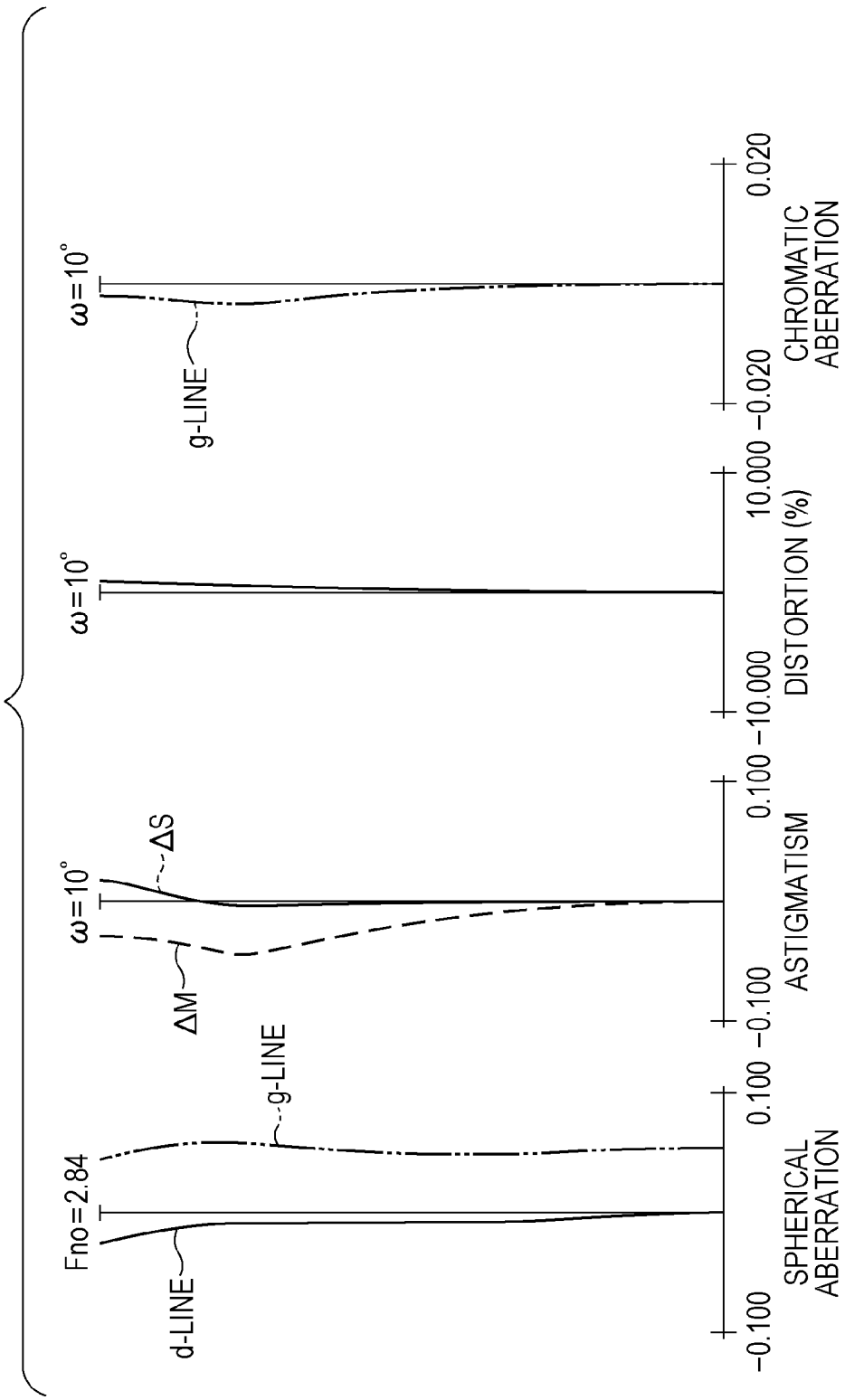

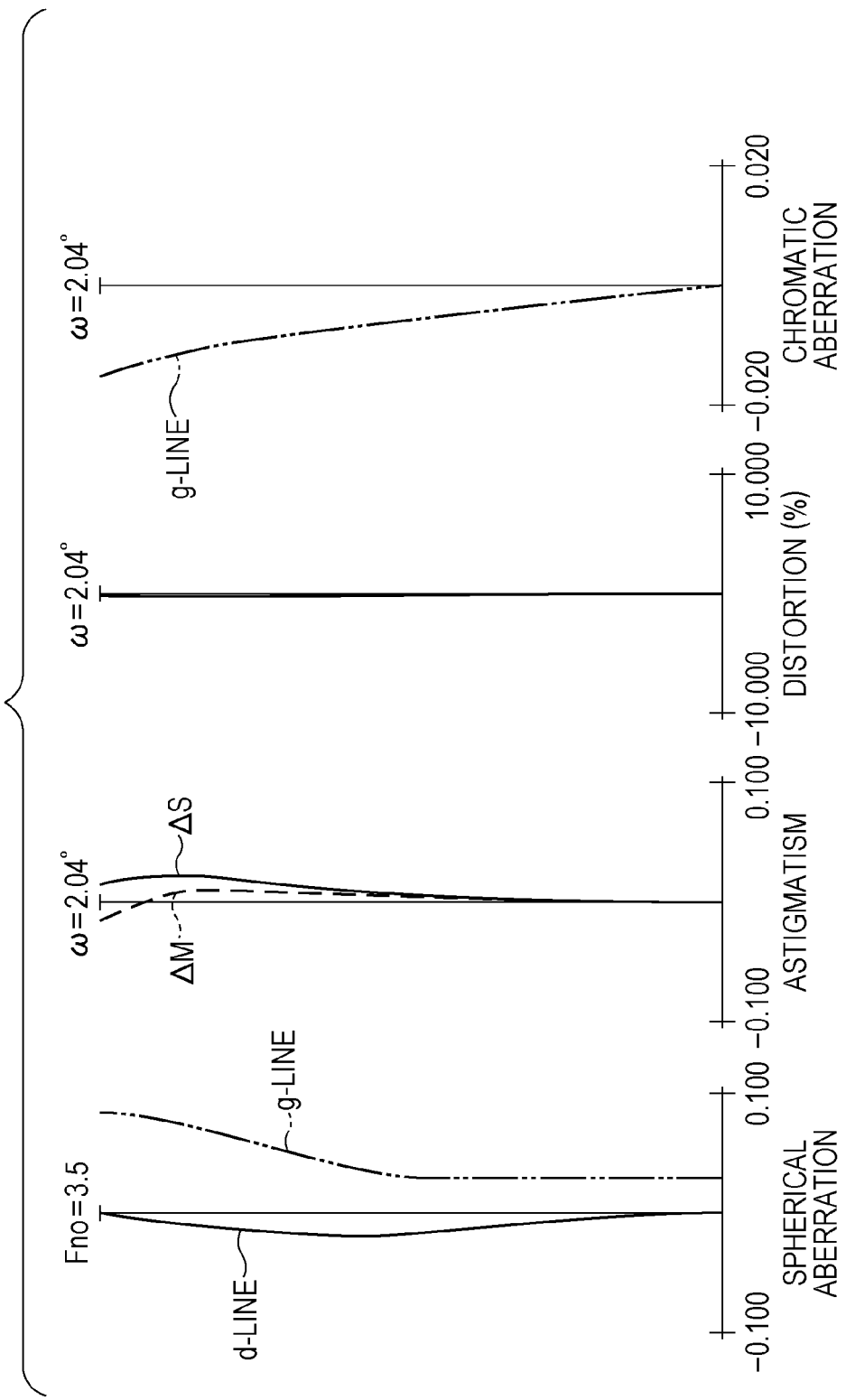

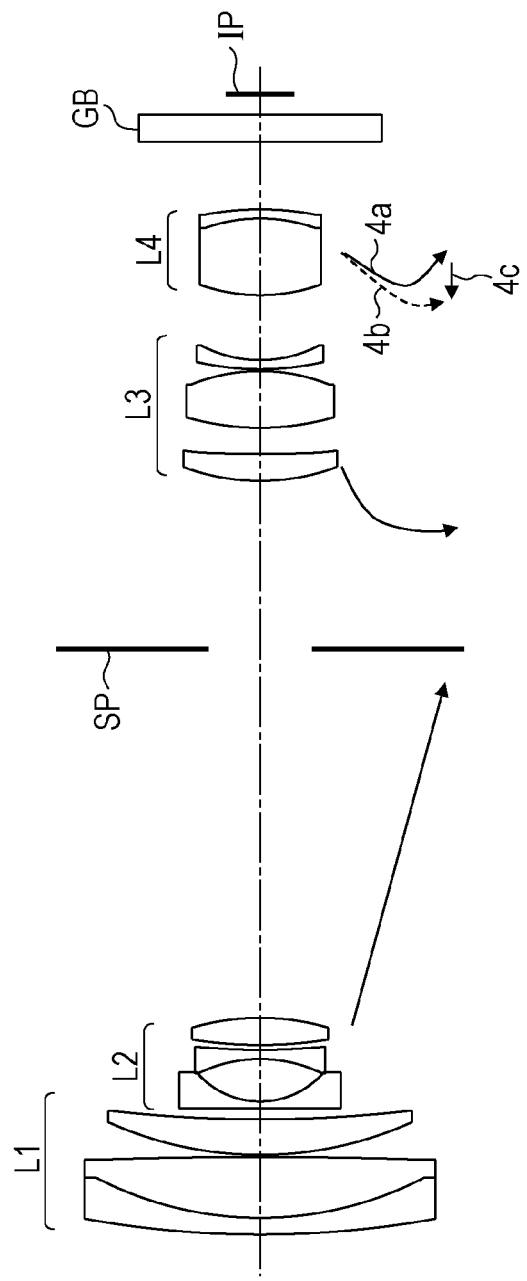

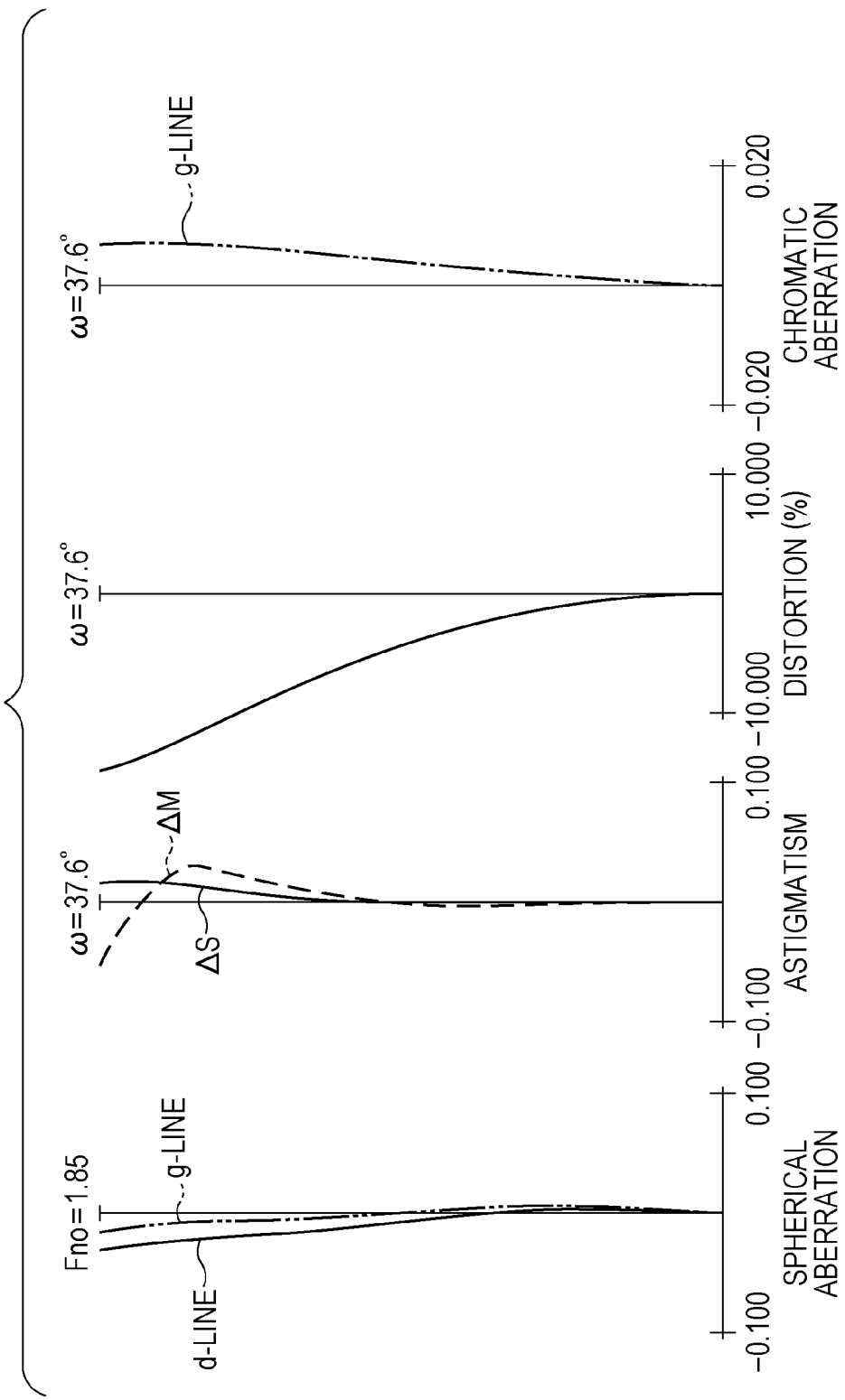

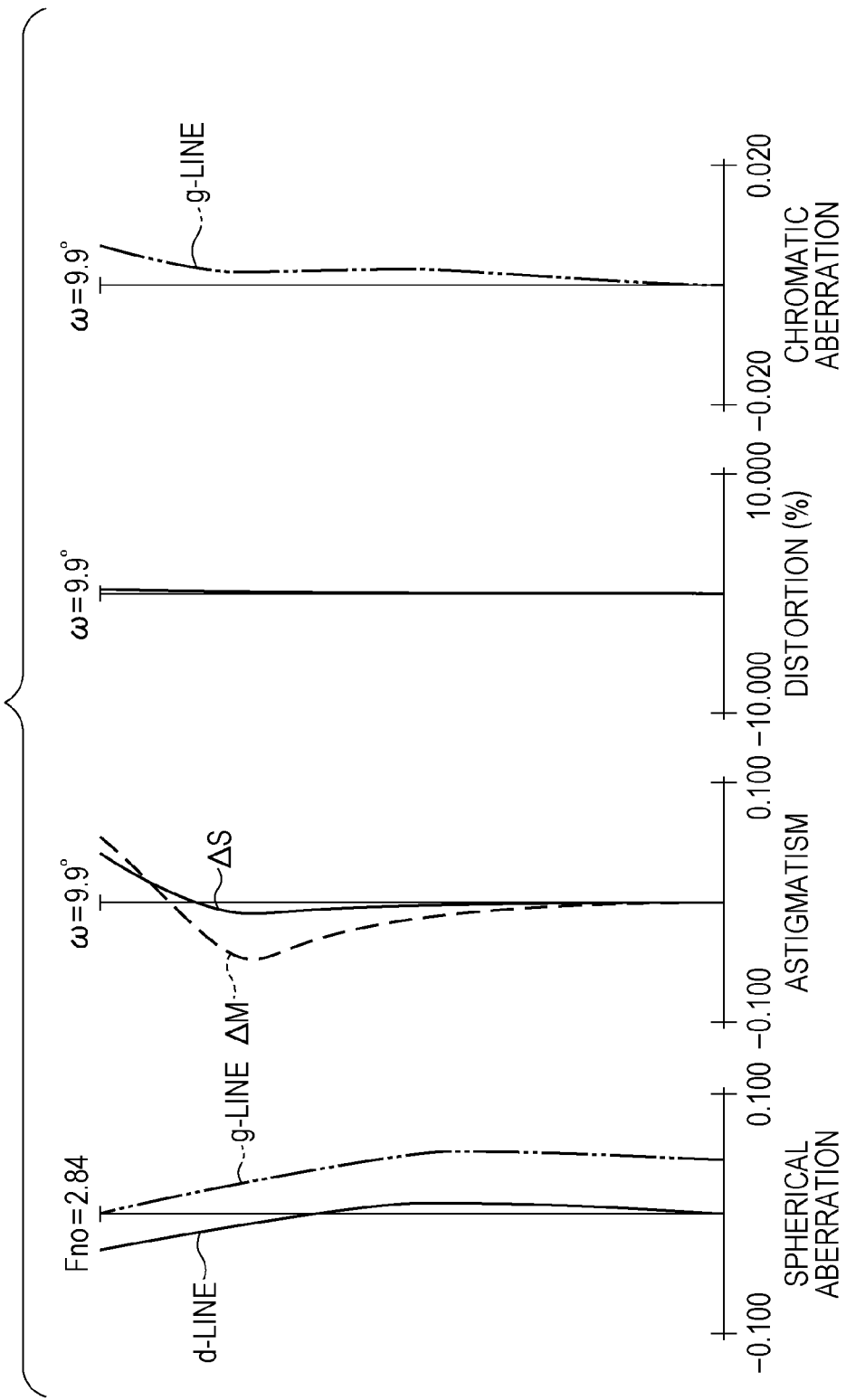

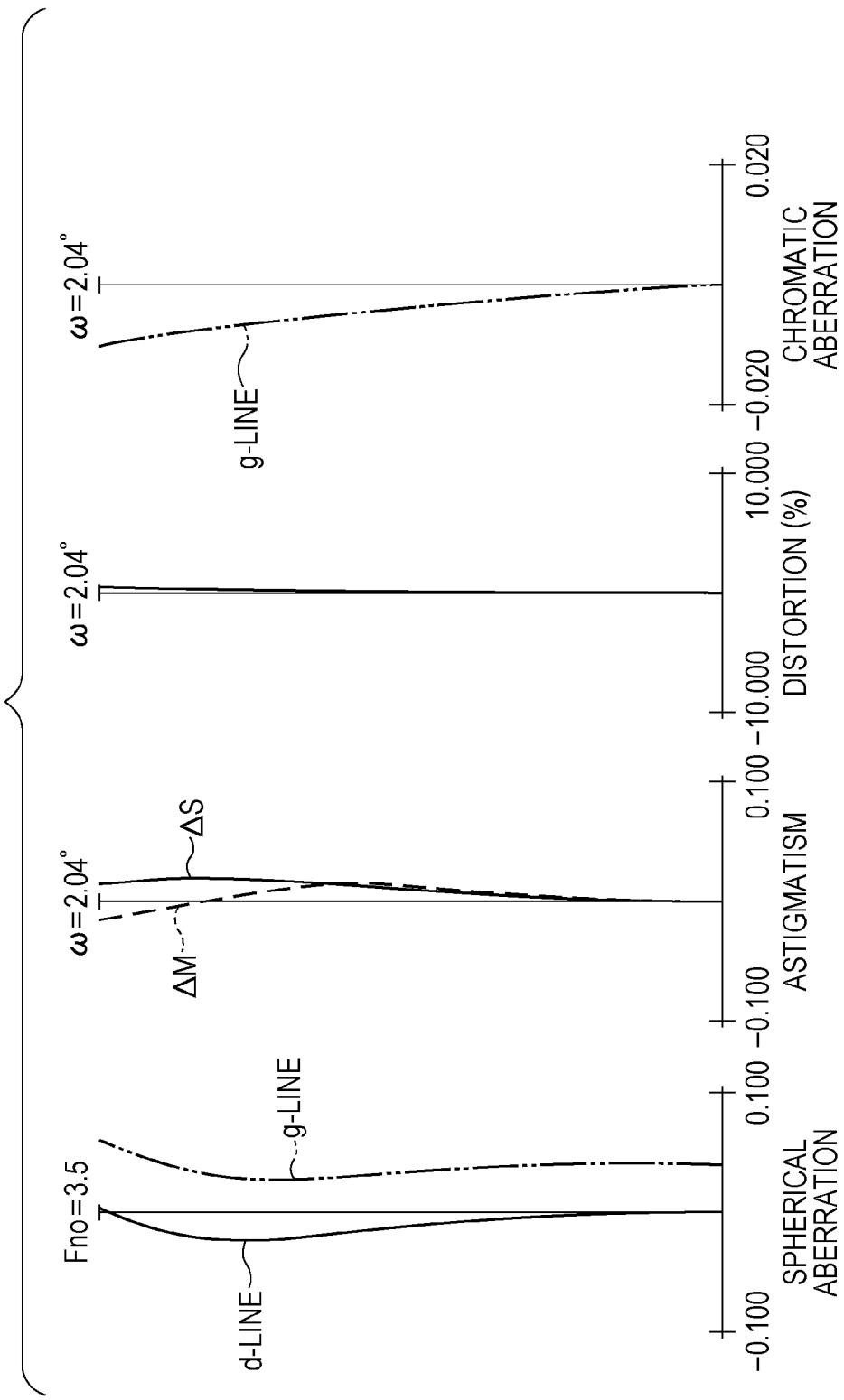

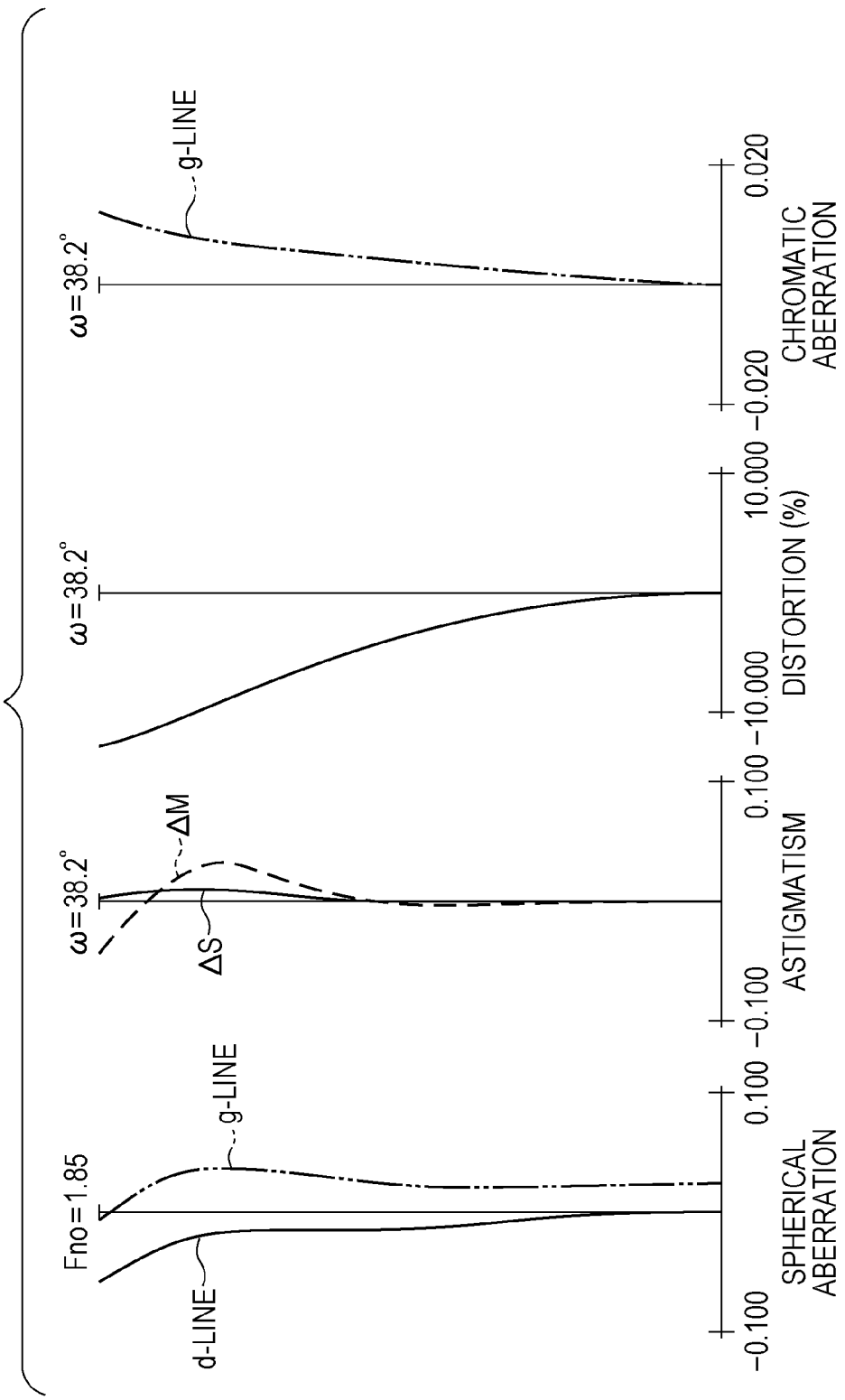

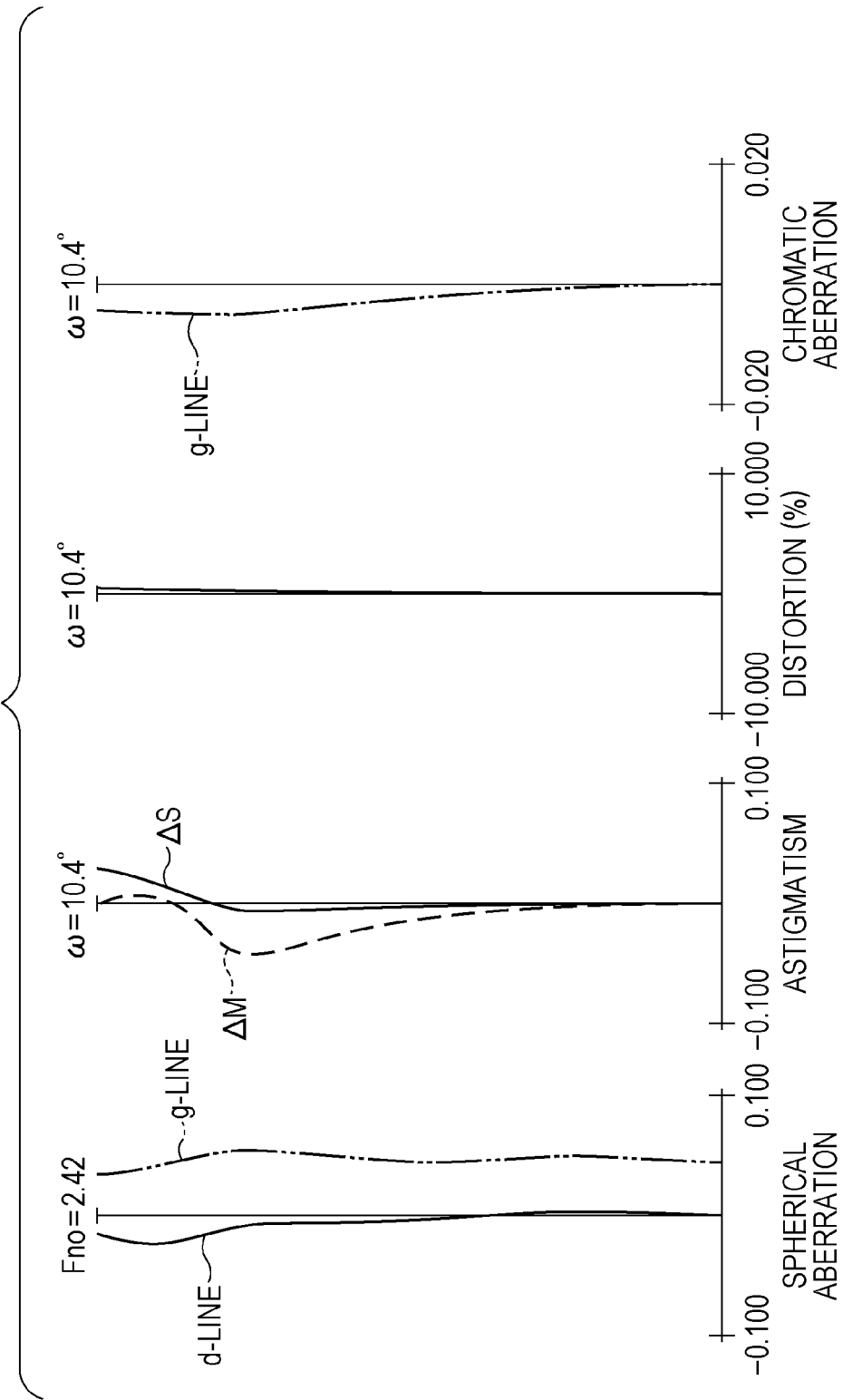

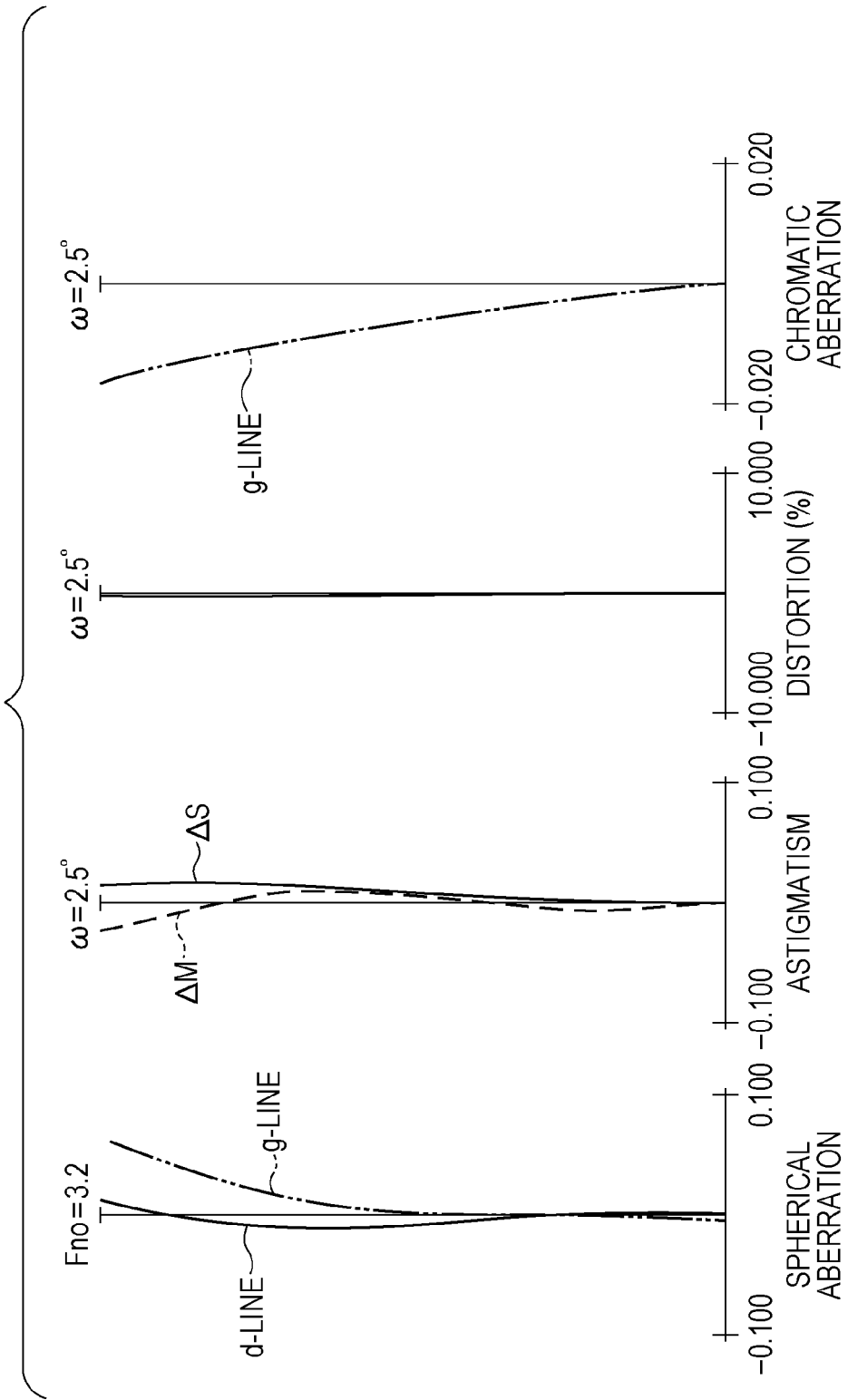

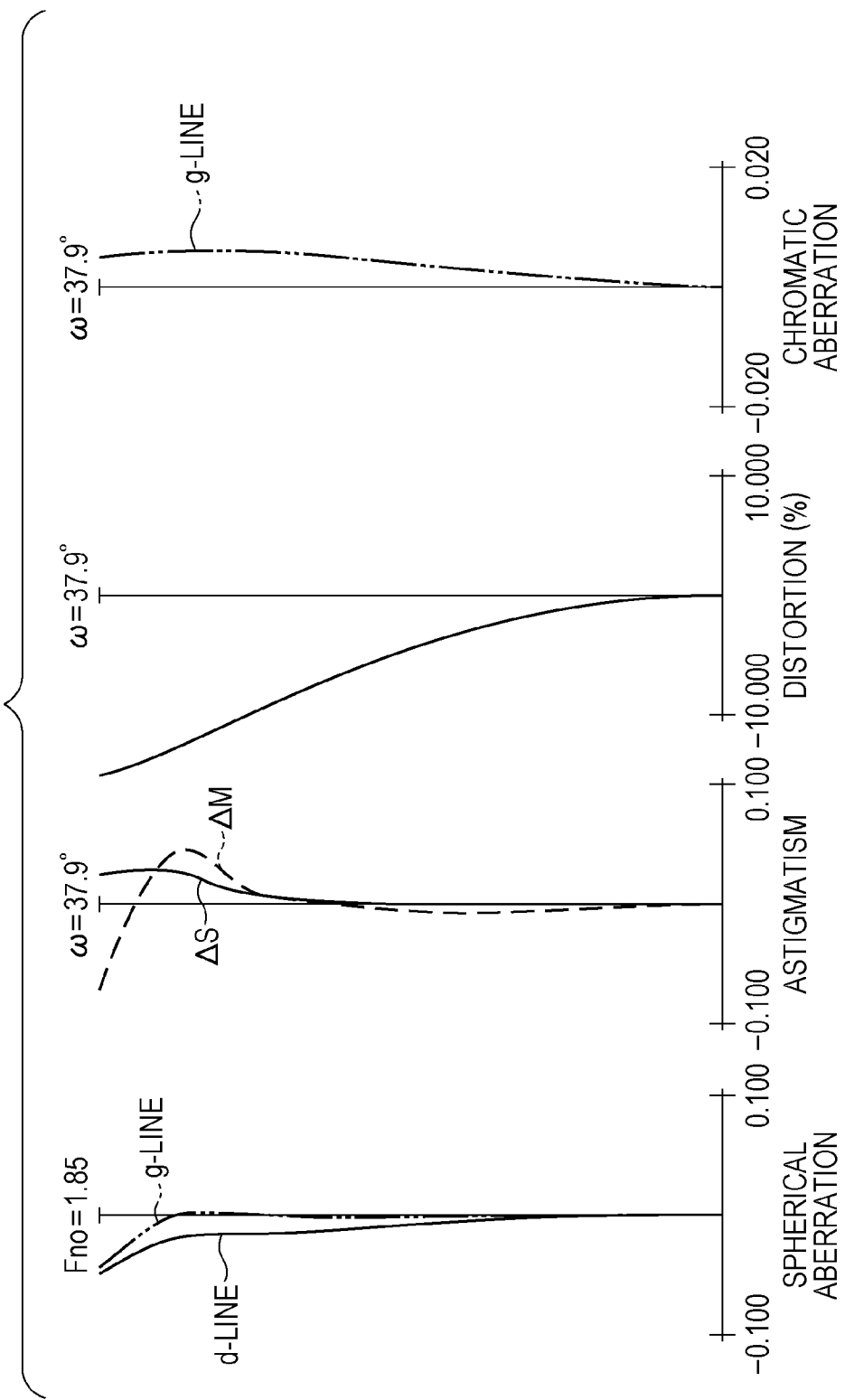

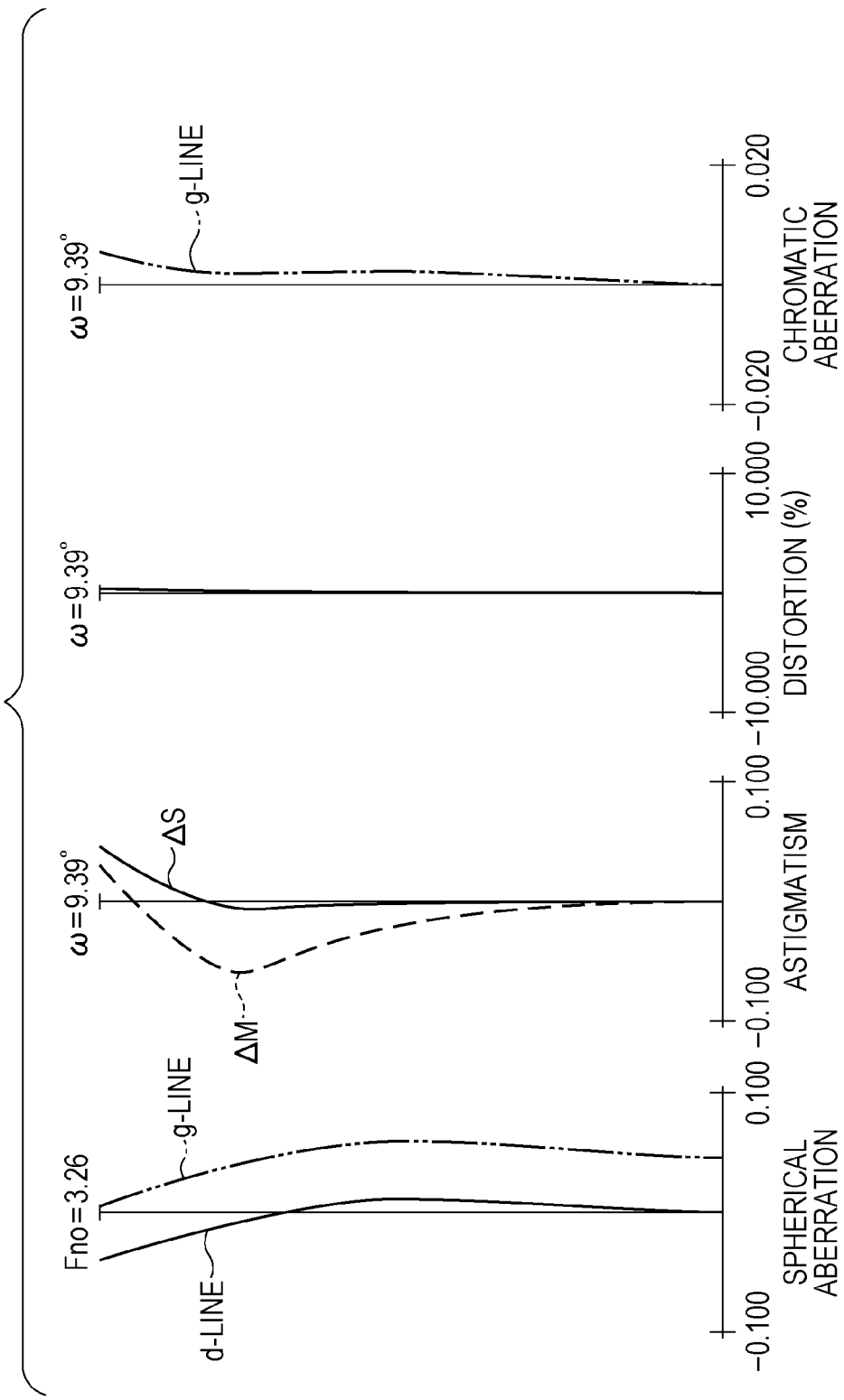

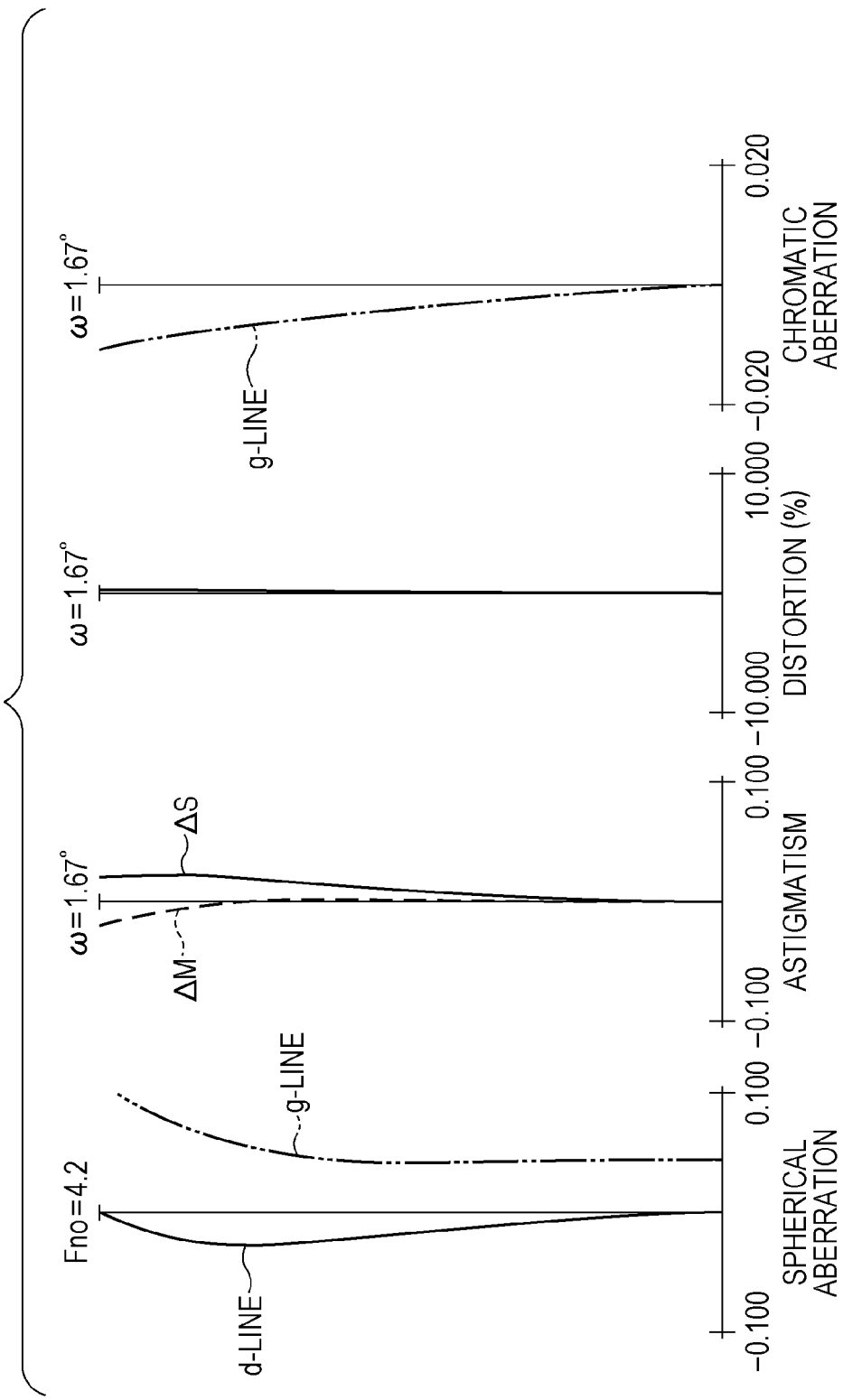

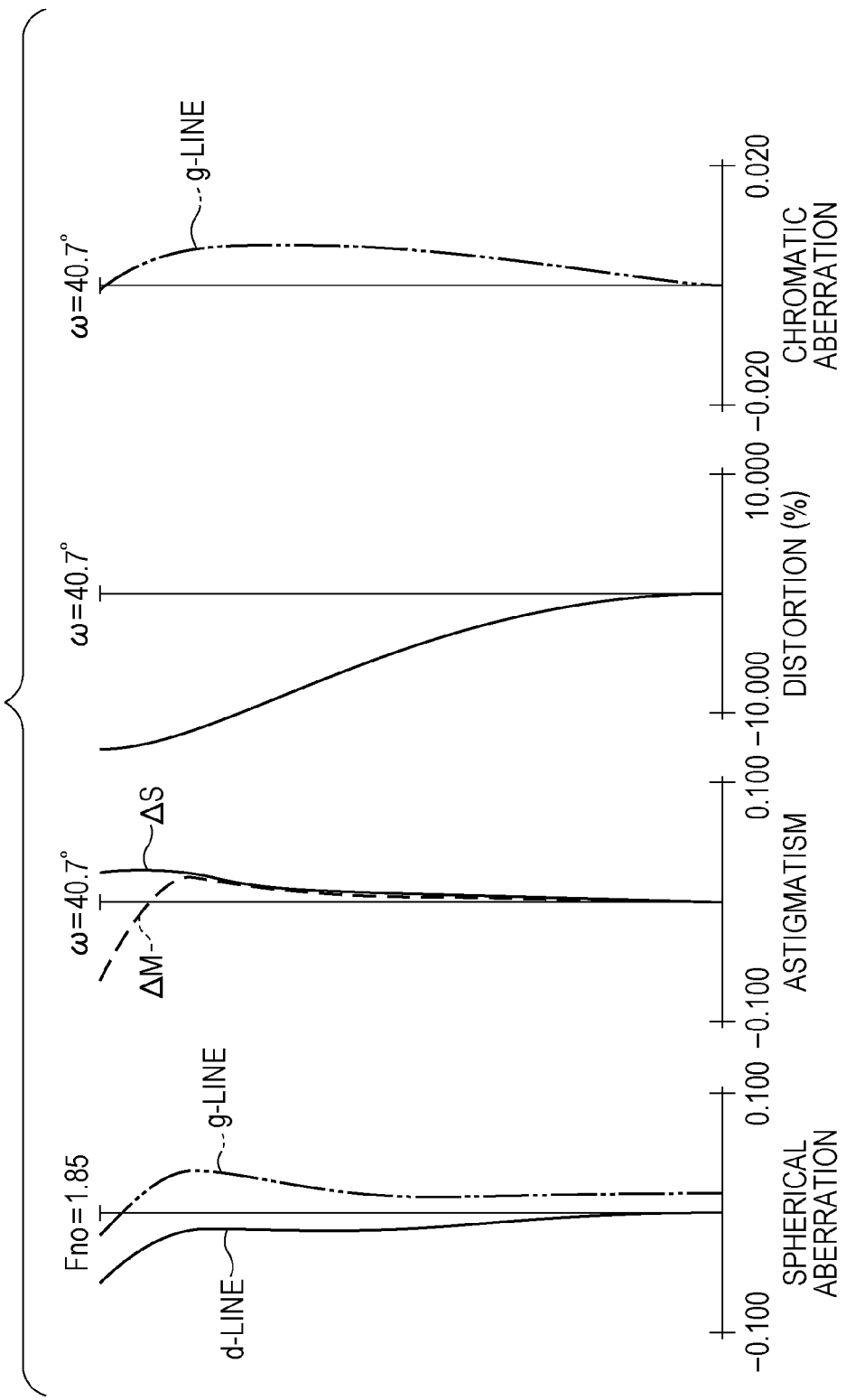

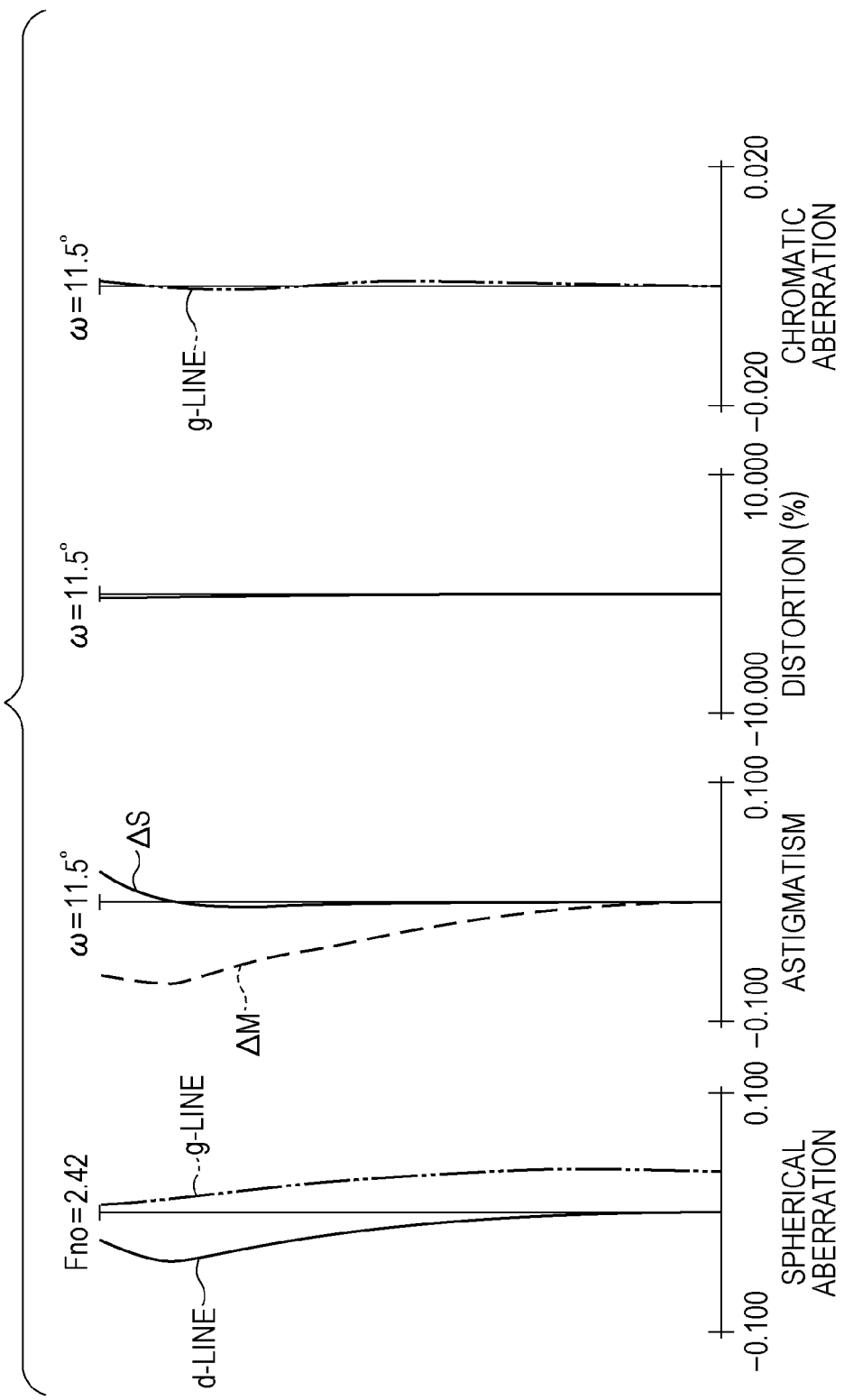

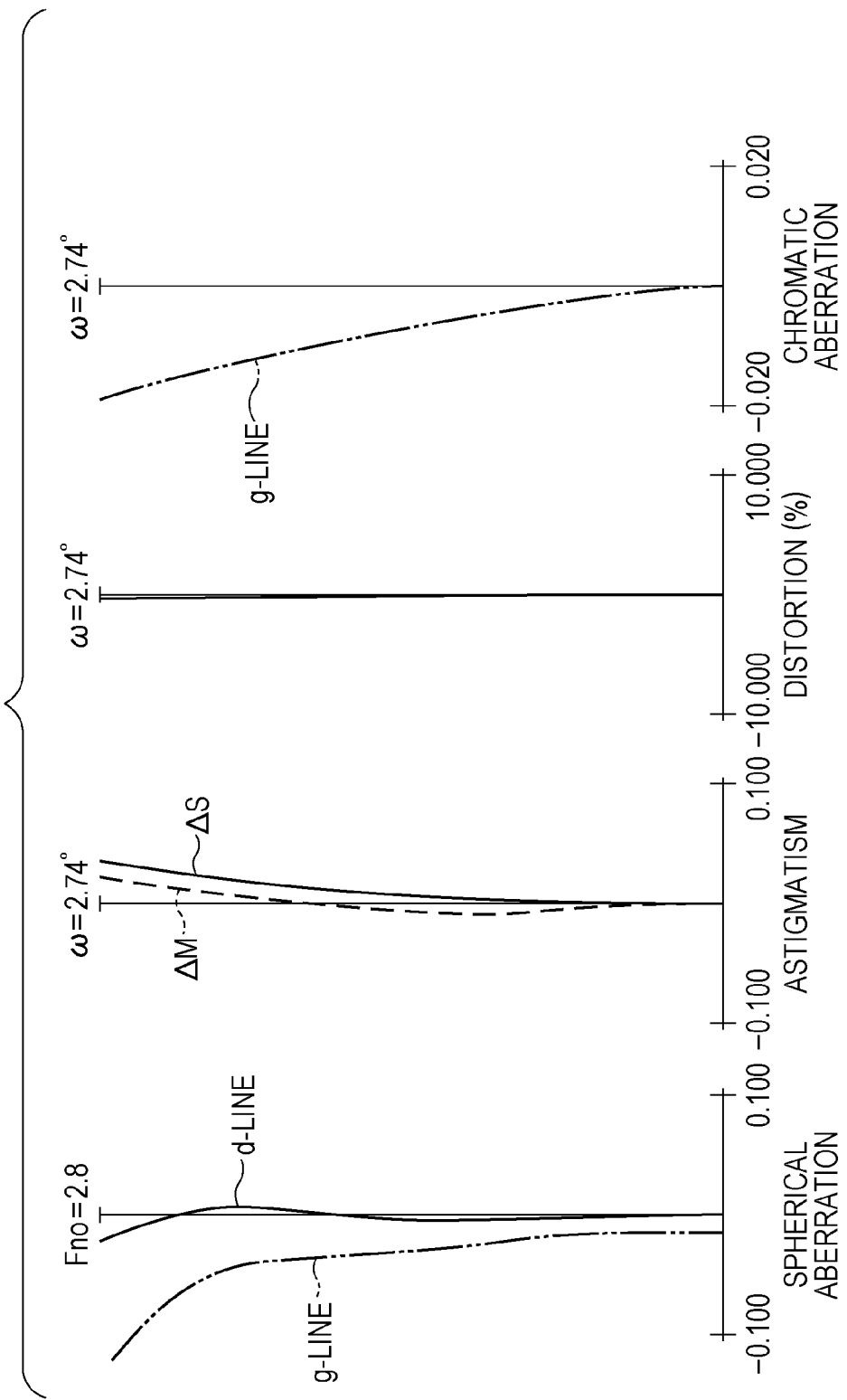

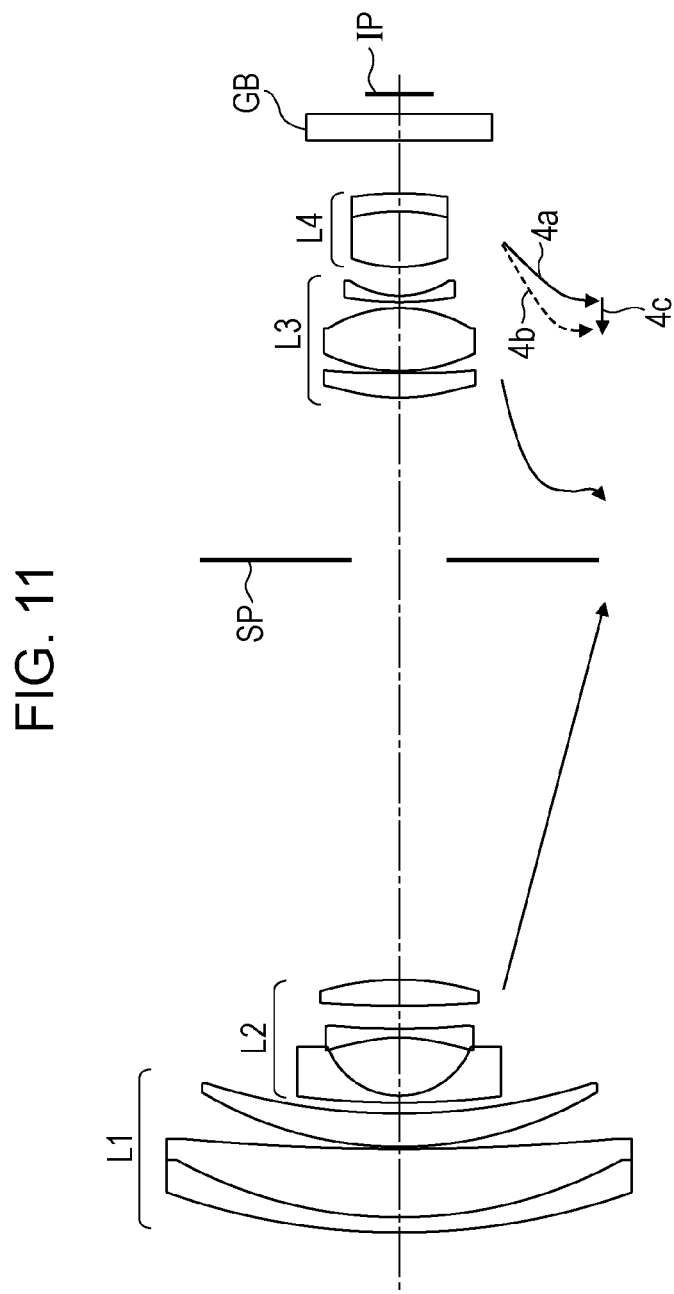

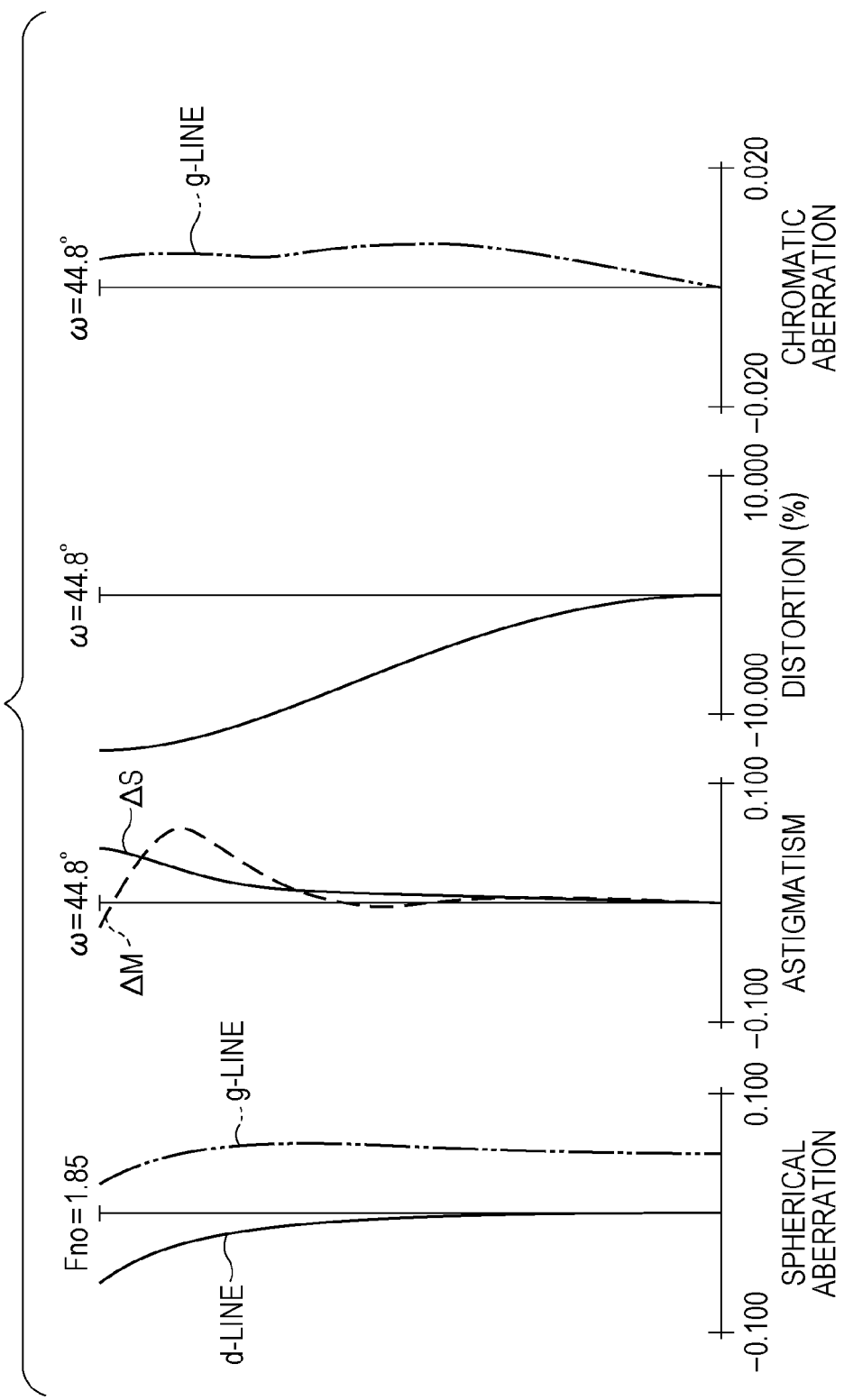

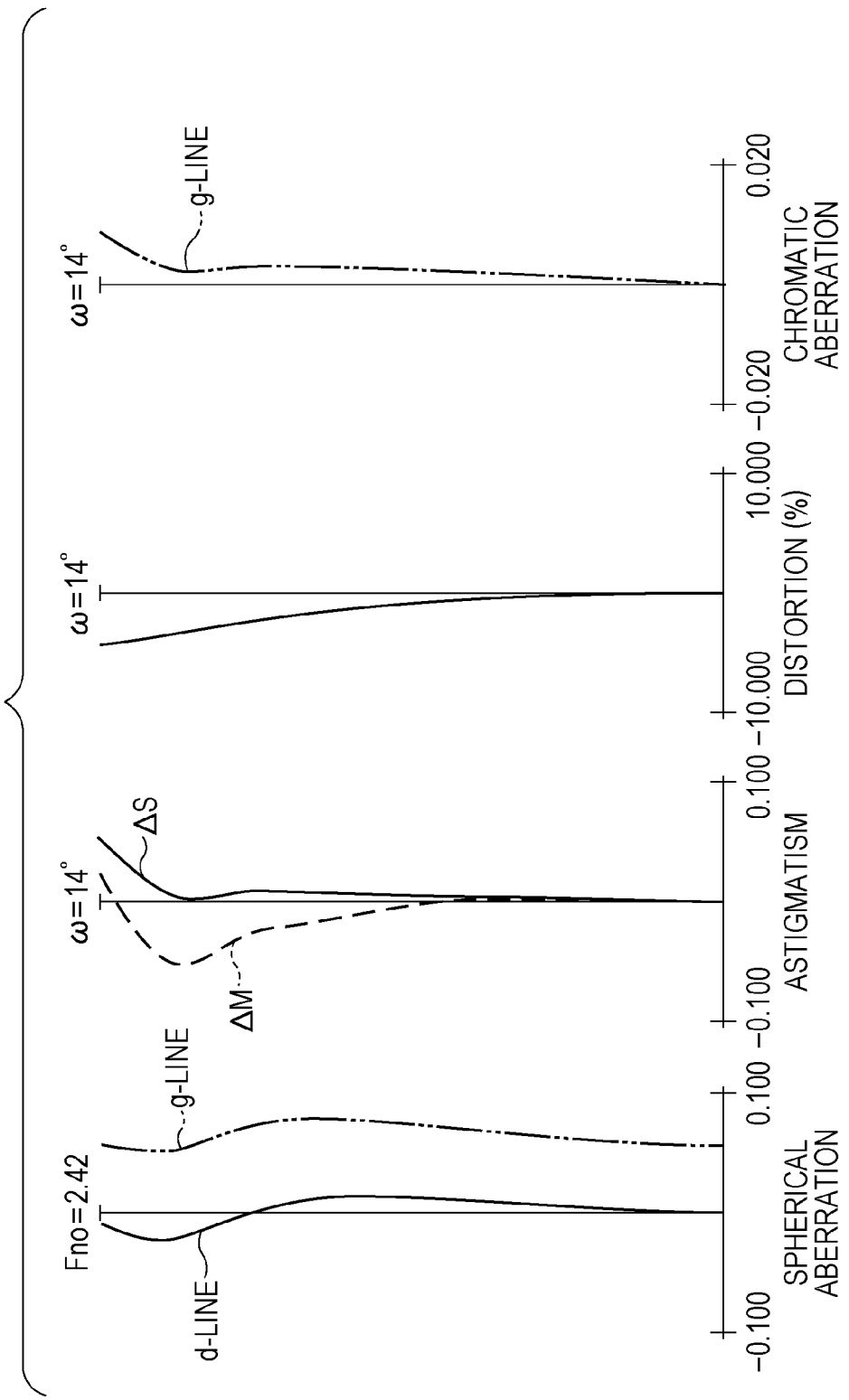

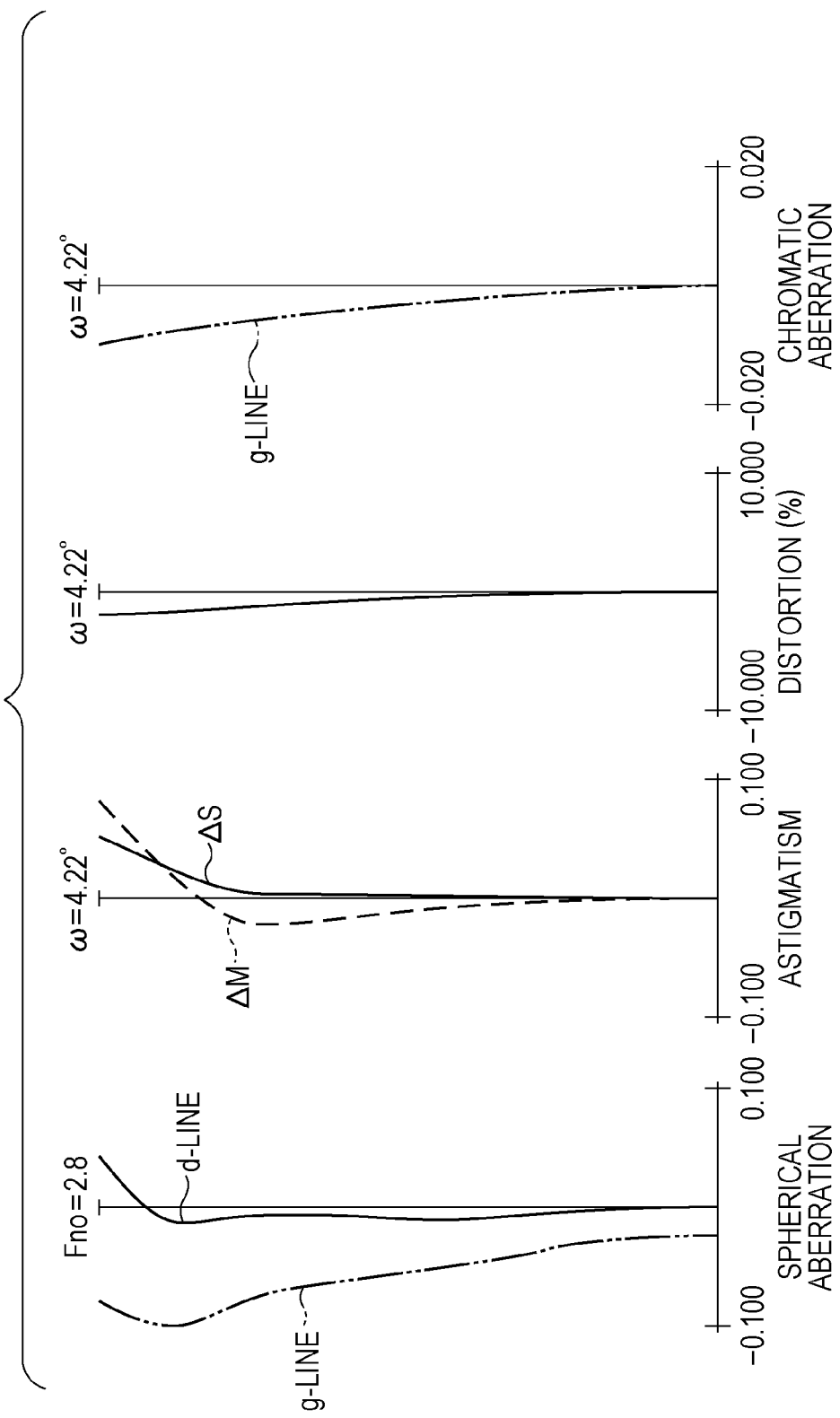

ZOOM LENS AND IMAGE PICKUP APPARATUS INCLUDING THE SAME

BACKGROUND OF THE INVENTION

1. Field of the Invention

The present invention relates to zoom lenses and particularly to a zoom lens that is suitable as an image taking optical system for image pickup apparatuses such as video cameras, security cameras, digital still cameras, broadcast cameras, and silver-halide-film cameras.

2. Description of the Related Art

Image taking optical systems included in image pickup apparatuses, such as video cameras, security cameras, and digital still cameras, including solid-state image pickup devices are desired to be zoom lenses that are of small sizes with wide angles of view and high zoom ratios. Furthermore, such image taking optical systems are desired to be zoom lenses exhibiting high optical performance at all zooming positions. One of known zoom lenses that satisfy such demands is a four-unit zoom lens that includes first to fourth lens units having positive, negative, positive, and positive refractive powers, respectively, in that order from an object side toward an image side.

For example, Japanese Patent Laid-Open No. 8-82743 and U.S. Patent Application Publication No. 2011/0176225 each disclose a rear-focusing four-unit zoom lens in which zooming is performed by moving a second lens unit and a third lens unit, and focusing and correction of image plane variations that may occur during zooming are performed by moving a fourth lens unit.

To realize high optical performance at all zooming positions with a wide angle of view and a high zoom ratio, it is important to appropriately set the type of zooming, the refractive powers of the lens units, the configurations of the lens units, among other parameters. In a rear-focusing four-unit zoom lens, it is important to appropriately set the refractive power, the length of travel during zooming, the magnification, and other parameters of the second lens unit that is used for zooming.

Unless such items are set appropriately, it is difficult to realize high optical performance at all zooming positions while at the same time maintaining the size of the zoom lens small with a wide angle of view and high zoom ratio.

SUMMARY OF THE INVENTION

The present invention is directed to a zoom lens of a small size that exhibits high optical performance at all zooming positions with a wide angle of view and a high zoom ratio, and an image pickup apparatus including such zoom lens.

According to an aspect of the present invention, a zoom lens includes, in order from an object side toward an image side, a first lens unit having a positive refractive power, a second lens unit having a negative refractive power, a third lens unit having a positive refractive power, and a fourth lens unit having a positive refractive power. The second lens unit, the third lens unit, and the fourth lens unit are moved during zooming. A position of the third lens unit at a telephoto end is closer to the object side than a position of the third lens unit at a wide-angle end. The zoom lens satisfies the following conditional expressions:

$$-3.2 < f2/fw < -2.0$$

$$3.5 < |m2/f2| < 5.1$$

where fw denotes a focal length of the zoom lens at the wide-angle end, m2 denotes a difference in the position of the second lens unit on an optical axis between that at the wide-angle end and that at the telephoto end, and f2 denotes a focal length of the second lens unit.

Further features of the present invention will become apparent from the following description of exemplary embodiments with reference to the attached drawings.

BRIEF DESCRIPTION OF THE DRAWINGS

FIG. 1 is a sectional view of a zoom lens according to a first embodiment of the present invention that is at a wide-angle end.

FIGS. 2A, 2B, and 2C are diagrams illustrating aberrations of the zoom lens according to the first embodiment that is at the wide-angle end, at an intermediate zooming position, and at a telephoto end, respectively.

FIG. 3 is a sectional view of a zoom lens according to a second embodiment of the present invention that is at a wide-angle end.

FIGS. 4A, 4B, and 4C are diagrams illustrating aberrations of the zoom lens according to the second embodiment that is at the wide-angle end, at an intermediate zooming position, and at a telephoto end, respectively.

FIGS. 6A, 6B, and 6C are diagrams illustrating aberrations of the zoom lens according to the third embodiment that is at the wide-angle end, at an intermediate zooming position, and at a telephoto end, respectively.

FIGS. 8A, 8B, and 8C are diagrams illustrating aberrations of the zoom lens according to the fourth embodiment that is at the wide-angle end, at an intermediate zooming position, and at a telephoto end, respectively.

FIGS. 10A, 10B, and 10C are diagrams illustrating aberrations of the zoom lens according to the fifth embodiment that is at the wide-angle end, at an intermediate zooming position, and at a telephoto end, respectively.

FIG. 11 is a sectional view of a zoom lens according to a sixth embodiment of the present invention that is at a wide-angle end.

FIGS. 12A, 12B, and 12C are diagrams illustrating aberrations of the zoom lens according to the sixth embodiment that is at the wide-angle end, at an intermediate zooming position, and at a telephoto end, respectively.

DESCRIPTION OF THE EMBODIMENTS

Embodiments of the zoom lens and the image pickup apparatus including the same according to the present invention will now be described with reference to the attached drawings. Zoom lenses according to the following embodiments of the present invention each include, in order from an object side toward an image side, a first lens unit having a positive refractive power, a second lens unit having a negative refractive power, a third lens unit having a positive refractive power, and a fourth lens unit having a positive refractive power. The second lens unit, the third lens unit, and the fourth lens unit are moved during zooming.

FIG. 1 is a sectional view of a zoom lens according to a first embodiment of the present invention that is at a wide-angle end (short-focal-length end). FIGS. 2A, 2B, and 2C are diagrams illustrating aberrations of the zoom lens according to the first embodiment that is at the wide-angle end, at an intermediate zooming position, and at a telephoto end (long-focal-length end), respectively. FIG. 3 is a sectional view of a zoom lens according to a second embodiment of the present invention that is at a wide-angle end. FIGS. 4A, 4B, and 4C are diagrams illustrating aberrations of the zoom lens according to the second embodiment that is at the wide-angle end, at an intermediate zooming position, and at a telephoto end, respectively.

Figure 5:
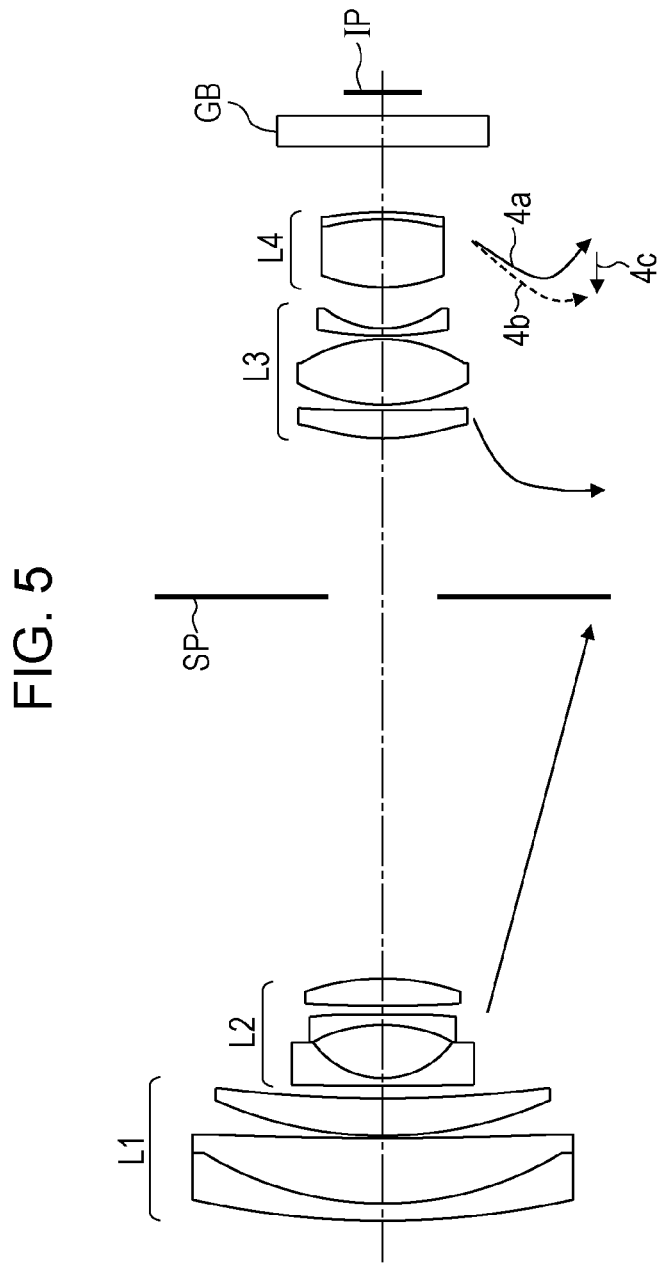
FIG. 5 is a sectional view of a zoom lens according to a third embodiment of the present invention that is at a wide-angle end.
Figure 7:
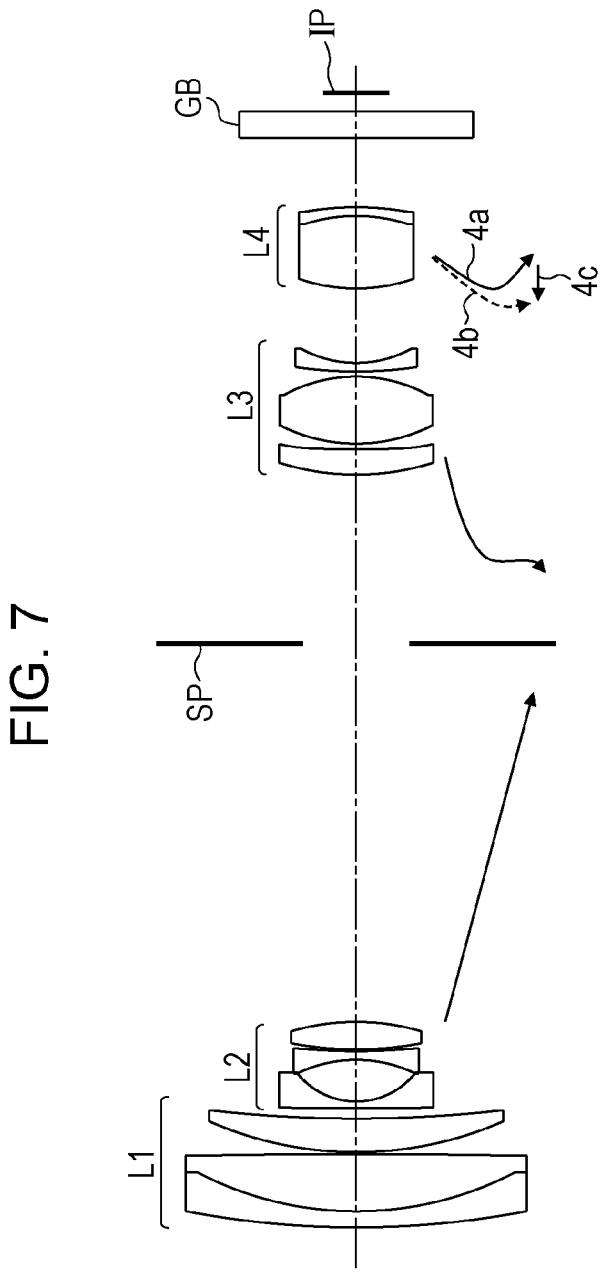
FIG. 7 is a sectional view of a zoom lens according to a fourth embodiment of the present invention that is at a wide-angle end.

FIG. 5 is a sectional view of a zoom lens according to a third embodiment of the present invention that is at a wide-angle end. FIGS. 6A, 6B, and 6C are diagrams illustrating aberrations of the zoom lens according to the third embodiment that is at the wide-angle end, at an intermediate zooming position, and at a telephoto end, respectively. FIG. 7 is a sectional view of a zoom lens according to a fourth embodiment of the present invention that is at a wide-angle end. FIGS. 8A, 8B, and 8C are diagrams illustrating aberrations of the zoom lens according to the fourth embodiment that is at the wide-angle end, at an intermediate zooming position, and at a telephoto end, respectively.

Figure 9:
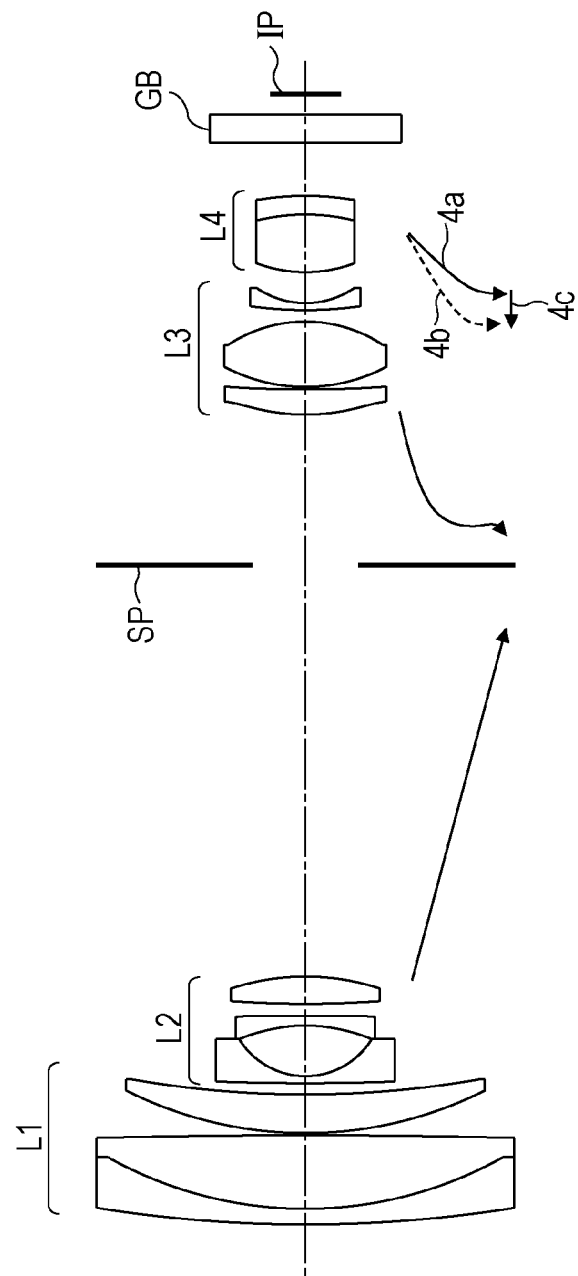
FIG. 9 is a sectional view of a zoom lens according to a fifth embodiment of the present invention that is at a wide-angle end.
Figure 13:
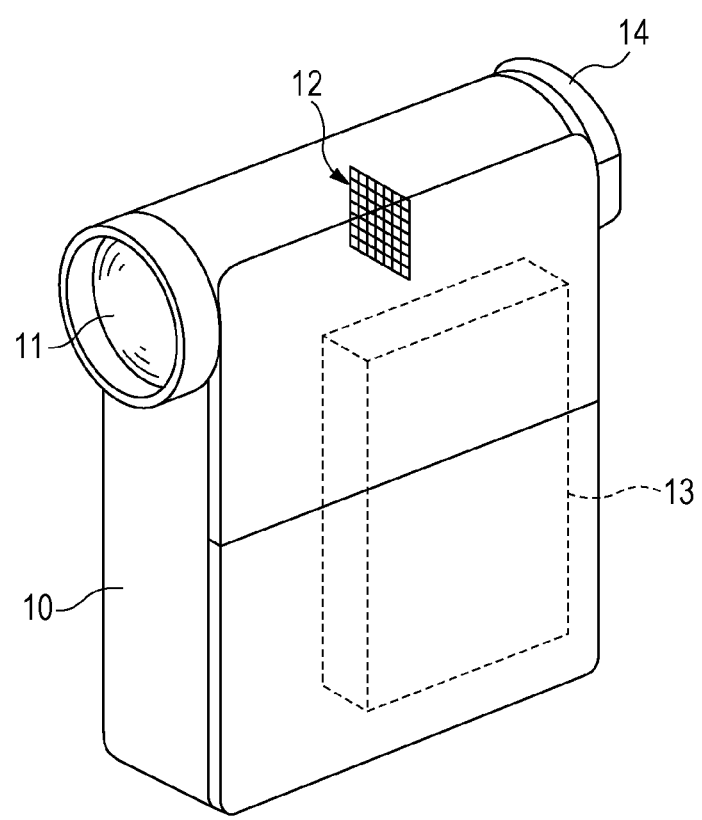
FIG. 13 is a schematic diagram illustrating relevant parts of a video camera (image pickup apparatus) including any of the zoom lenses according to the first to sixth embodiments of the present invention.

FIG. 9 is a sectional view of a zoom lens according to a fifth embodiment of the present invention that is at a wide-angle end. FIGS. 10A, 10B, and 10C are diagrams illustrating aberrations of the zoom lens according to the fifth embodiment that is at the wide-angle end, at an intermediate zooming position, and at a telephoto end, respectively. FIG. 11 is a sectional view of a zoom lens according to a sixth embodiment of the present invention that is at a wide-angle end. FIGS. 12A, 12B, and 12C are diagrams illustrating aberrations of the zoom lens according to the sixth embodiment that is at the wide-angle end, at an intermediate zooming position, and at a telephoto end, respectively. FIG. 13 is a schematic diagram illustrating relevant parts of a video camera (image pickup apparatus) including any of the zoom lenses according to the first to sixth embodiments of the present invention.

Each of the zoom lenses according to the first to sixth embodiments is an image taking optical system included in an image pickup apparatus. In the sectional views of the zoom lenses, the left side corresponds to an object side, and the right side corresponds to an image side. Each zoom lens includes a first lens unit L1 having a positive refractive power, a second lens unit L2 having a negative refractive power, a third lens unit L3 having a positive refractive power, and a fourth lens unit L4 having a positive refractive power. An aperture stop SP is provided on the object side of the third lens unit L3. Arrows in the drawings represent movement loci of relevant lens units that are moved during zooming from the wide-angle end to the telephoto end.

The aperture stop SP of the zoom lens according to each of the embodiments is stationary during zooming. Alternatively, the aperture stop SP may be movable within an appropriate range. In that case, a further reduction in the size of the zoom lens is realized. In each of the embodiments, the aperture stop SP is stationary during zooming, whereby the configuration of the image pickup apparatus is simplified. An optical block GB corresponds to an optical filter, a faceplate, or the like. An image plane IP corresponds to a surface of a solid-state image pickup device such as a charge-coupled-device (CCD) sensor or a complementary-metal-oxide-semiconductor (CMOS) sensor when the zoom lens is used as an image taking optical system included in a digital still camera or a video camera, or IP corresponds to a film surface when the zoom lens is used as an image taking optical system included in a silver-halide-film camera.

In each of the diagrams illustrating aberrations, spherical aberration is for d-line and g-line, astigmatism is for meridional image plane ΔM and sagittal image plane ΔS, and lateral chromatic aberration is for g-line. Furthermore, Fno denotes f-number, and w denotes half angle of view (in degrees). In each of the embodiments, the wide-angle end and the telephoto end refer to zooming positions at extreme ends, respectively, of a range in which the lens units that are used for zooming are mechanically movable along the optical axis.

In each of the embodiments, during zooming from the wide-angle end to the telephoto end, the second lens unit L2 moves monotonously toward the image side while the third lens unit L3 moves monotonously toward the object side or along a movement locus that is convex toward the object side as represented by corresponding arrows. Zooming is performed such that a position of the third lens unit L3 at the telephoto end is closer to the object side than a position of the third lens unit L3 at the wide-angle end.

In each of the zoom lenses according to the first to fourth embodiments, variations in the image plane position (image plane variations) that may occur during zooming are corrected by moving the fourth lens unit L4 along a movement locus that is convex toward the object side. In each of the zoom lenses according to the fifth and sixth embodiments, image plane variations that may occur during zooming are corrected by moving the fourth lens unit L4 monotonously toward the object side.

More specifically, the first to sixth embodiments each employ a rear-focusing method in which focusing is performed by moving the fourth lens unit L4 along the optical axis. A solid-line curve 4a and a dotted-line curve 4b represent movement loci along which the fourth lens unit L4 is moved in correcting image plane variations that may occur during zooming in cases where the zoom lens is focused on an object at infinity and on a near object, respectively. In each of the zoom lenses according to the first to fourth embodiments, the fourth lens unit L4 is moved along a movement locus that is convex toward the object side, whereby the space between the third lens unit L3 and the fourth lens unit L4 is used efficiently, reducing the total length of the zoom lens.

In each of the first to sixth embodiments, focusing from the object at infinity to the near object at the telephoto end is performed by moving the fourth lens unit L4 forward as represented by an arrow 4c. The first lens unit L1, which is stationary in the optical-axis direction during focusing, may be moved for correction of aberrations according to need. When an image is taken, blurring of the taken image that may occur when the zoom lens vibrates is corrected by moving the entirety or part of the third lens unit L3 in a direction that is nonparallel to the optical axis.

The zoom lens according to each of the embodiments of the present invention is characterized in being of a small size in spite of having a wide angle of view and a high zoom ratio. To realize a wide angle of view, a negative-lead zoom lens is advantageous in which a lens unit having a negative refractive power is provided at the extreme end on the object side. In a negative-lead zoom lens, however, as the magnification is increased, the f-number becomes larger. This means that the image becomes darker, particularly at the telephoto end. Consequently, it tends to be difficult to realize a high magnification.

In a positive-lead zoom lens in which a lens unit having a positive refractive power is provided at the extreme end on the object side, the increase in the f-number during zooming is small. Therefore, the embodiments of the present invention all employ a positive-lead four-unit zoom lens including first to fourth lens units L1 to L4 having positive, negative, positive, and positive refractive powers, respectively, in that order from the object side toward the image side. To realize a high zoom ratio, it is important to reduce the size of the zoom lens while reducing the lengths of travel of the lens units that are used for zooming and reducing variations in aberrations that may occur during zooming.

In the above-described rear-focusing four-unit zoom lens in which the third lens unit is stationary during zooming while the fourth lens unit is used for focusing, the third lens unit has a small share of zoom ratio. Therefore, to increase the zoom ratio, the shares of zoom ratio allocated to the second and fourth lens units need to be increased. In that case, the lengths of travel (strokes) of the second and fourth lens units during zooming become large, thus increasing the size of the zoom lens, which is undesirable.

In contrast, in each of the embodiments of the present invention, the share of zoom ratio allocated to the third lens unit L3 is increased by moving the third lens unit L3 toward the object side during zooming from the wide-angle end to the telephoto end, whereby the lengths of travel of the second and fourth lens units L2 and L4 during zooming are reduced. Thus, variations in aberrations that may occur during zooming are reduced while the size of the zoom lens is reduced.

When the angle of view is widened, the incident angle of light on the front lens unit (first lens unit) becomes large. Therefore, to reduce the size of the zoom lens, it is important to determine the location where the entrance pupil is set. Particularly, in the rear-focusing four-unit zoom lens described above, the effective diameter of the front lens unit tends to be determined at a zooming position that is slightly shifted from the wide-angle end toward the telephoto end. Hence, to reduce the effective diameter of the front lens unit, the entrance pupil at the zooming position that is slightly shifted toward the telephoto end needs to be set at a position near the first lens unit.

In each of the embodiments of the present invention, during zooming from the wide-angle end to the telephoto end, a zooming effect is produced by moving the third lens unit L3 toward the object side and thus reducing the share of zoom ratio allocated to the second lend unit, whereby the length of travel of the second lens unit during zooming is reduced. Hence, by setting the entrance pupil at a position near the first lens unit with the focal length unchanged, a wide angle of view and a reduction in the effective diameter of the front lens unit are realized simultaneously.

As described above, in the zoom lens according to each of the embodiments of the present invention, the third lens unit L3 is moved toward the object side during zooming from the wide-angle end to the telephoto end, whereby the share of zoom ratio allocated to the third lens unit L3 is increased. Thus, the widening of the angle of view, the increase in the zoom ratio, and the reduction in the size of the zoom lens are facilitated.

In each of the embodiments, when zooming from the wide-angle end to the telephoto end, the position of the third lens unit L3 along the optical axis at the telephoto end is closer to the object side than the position of the third lens unit L3 at the wide-angle end. Defining the focal length of the zoom lens at the wide-angle end as fw, the difference in the position of the second lens unit L2 on the optical axis between at the wide-angle end and that at the telephoto end as m2, and the focal length of the second lens unit L2 as f2, the zoom lens satisfies the following conditional expressions:

$$-3.2 < f2/fw < -2.0 \quad (1)$$

$$3.5 < |m2/f2| < 5.1 \quad (2)$$

where the sign of the positional difference m2 is negative when a position of the second lens unit L2 at the telephoto end is closer to the object side than a position of the second lens unit L2 at the wide-angle end, and is positive when the position of the second lens unit L2 at the telephoto end is closer the image side than the position of the second lens unit L2 at the wide-angle end.

In each of the embodiments, the third lens unit L3 is moved toward the object side during zooming from the wide-angle end to the telephoto end, whereby the share of zoom ratio allocated to the third lens unit L3 is increased. Furthermore, the lengths of travel of the second lens unit L2 and the fourth lens unit L4 during zooming are reduced, whereby the size of the zoom lens is reduced while the variations in aberrations that may occur during zooming are reduced. In this series of movements, the third lens unit L3 may be moved either monotonously toward the object side or along a movement locus that is convex toward the object side. To allocate a share of zoom ratio to the third lens unit L3, the position of the third lens unit L3 at the telephoto end can be set closer (further) to the object side than the position of the third lens unit L3 at the wide-angle end.

Conditional Expression (1) defines the refractive power of the second lens unit L2 under which the angle of view can be widened. If the upper limit of Conditional Expression (1) is exceeded, variations in field curvature, coma aberration, and lateral chromatic aberration with respect to the image height increase particularly on the wide-angle side. If the lower limit of Conditional Expression (1) is exceeded (reduced), the refractive power of the second lens unit L2 becomes small. Consequently, the length of travel of the second lens unit L2 during zooming increases, and hence the size of the zoom lens increases.

Conditional Expression (2) defines the length of travel of the second lens unit L2 during zooming and relates to the size and the zoom ratio of the zoom lens. If the upper limit of Conditional Expression (2) is exceeded, the length of travel of the second lens unit L2 during zooming increases. In that case, although it becomes easy to increase the zoom ratio, the size of the zoom lens increases. If the lower limit of Conditional Expression (2) is exceeded (reduced), the length of travel of the second lens unit L2 during zooming is reduced. In that case, although the size of the zoom lens is reduced, the zoom ratio is also reduced.

In each of the embodiments, the refractive power of the second lens unit L2, which is a major one of the lens units that are used for zooming, is increased so that a wide angle of view and a high zoom ratio are realized while the size of the zoom lens is reduced. In such a case, field curvature and coma aberration at the midpoint of image height increase on the wide-angle side, and variations in lateral chromatic aberration during zooming increase. Hence, in each of the embodiments, the length of travel of the second lens unit L2 during zooming is reduced by moving the third lens unit L3 toward the object side during zooming from the wide-angle end to the telephoto end and thus allocating some of the zooming effect to the third lens unit L3, whereby the above aberrations are reduced and the size of the zoom lens is reduced.

In each of the embodiments, at least one of the following conditions may further be satisfied:

$$2.5 < \beta2t/\beta2w < 25.0 \quad (3)$$

$$0.1 < |m3/m2| < 0.5 \quad (4)$$

$$1.0 < (\beta3t/\beta3w) \times (\beta4t/\beta4w) < 5.0 \quad (5)$$

where $\beta2w$ and $\beta2t$ denote the lateral magnifications of the second lens unit L2 at the wide-angle end and at the telephoto end, respectively; m3 denotes the difference in the position of the third lens unit L3 on the optical axis between that at the wide-angle end and that at the telephoto end; $\beta3w$ and $\beta3t$ denote the lateral magnifications of the third lens unit L3 at the wide-angle end and at the telephoto end, respectively; and $\beta4w$ and $\beta4t$ denote the lateral magnifications of the fourth lens unit L4 at the wide-angle end and at the telephoto end, respectively.

Technical meanings of the above conditional expressions will now be described.

Conditional Expression (3) defines the share of zoom ratio allocated to the second lens unit L2 so that, mainly, field curvature, lateral chromatic aberration, and other parameters are corrected well while the size of the zoom lens is reduced. If the upper limit of Conditional Expression (3) is exceeded, the share of zoom ratio allocated to the second lens unit L2 increases. In that case, the length of travel of the second lens unit L2 during zooming increases, and the effective diameter of the front lens unit increases. Furthermore, the refractive power of the second lens unit L2 increases. Consequently, variations in field curvature and lateral chromatic aberration that may occur during zooming also increase, making it difficult to correct such aberrations.

If the lower limit of Conditional Expression (3) is exceeded, the share of zoom ratio allocated to the second lens unit L2 is reduced. In that case, although the correction of field curvature and lateral chromatic aberration on the wide-angle side becomes easy, the share of zoom ratio allocated to the third lens unit L3 for realizing a predetermined zoom ratio of the zoom lens as a whole increases. Hence, the length of travel of the third lens unit L3 during zooming becomes too large, and the total length of the zoom lens increases.

Conditional Expression (4) defines the ratio of the length of travel of the third lens unit L3 during zooming to the length of travel of the second lens unit L2 during zooming so that, mainly, the size of the zoom lens is reduced while a predetermined zoom ratio of the zoom lens as a whole is realized. In each of the embodiments, the third lens unit L3 may be moved either monotonously toward the object side or along a movement locus that is convex toward the object side during zooming from the wide-angle end to the telephoto end. If the upper limit of Conditional Expression (4) is exceeded, however, the difference in the position of the third lens unit L3 on the optical axis between that at the wide-angle end and that at the telephoto end becomes too large, increasing the total length of the zoom lens.

If the lower limit of Conditional Expression (4) is exceeded, the length of travel of the second lens unit L2 during zooming increases significantly, increasing the total length of the zoom lens.

Conditional Expression (5) defines the respective zoom ratios of the third lens unit L3 and the fourth lens unit L4 so that, mainly, the size of the zoom lens is reduced while a predetermined zoom ratio of the zoom lens as a whole is realized. If the upper limit of Conditional Expression (5) is exceeded, the length of travel of at least one of the third lens unit L3 and the fourth lens unit L4 during zooming becomes too large, increasing the total length of the zoom lens. If the lower limit of Conditional Expression (5) is exceeded, the share of zoom ratio allocated to the second lens unit L2 increases. Consequently, the length of travel of the second lens unit L2 during zooming increases, and hence the total length of the zoom lens increases.

In each of the embodiments, the second lens unit L2 can include at least one aspherical surface. The above conditional expressions relate to the correction of aberrations and are particularly effective in reducing variations in field curvature, which tends to increase in a range from the wide-angle end to an intermediate zooming position when the angle of view is widened. In each of the embodiments, the ranges defined by Conditional Expressions (1) to (5) may preferably be set as follows in terms of correction of aberrations:

$$-3.15 < f2/fw < -2.01 \quad (1a)$$

$$3.55 < |m2/f2| < 4.95 \quad (2a)$$

$$2.8 < \beta2t/\beta2w < 23.0 \quad (3a)$$

$$0.15 < |m3/m2| < 0.47 \quad (4a)$$

$$1.1 < (\beta3t/\beta3w) \times (\beta4t/\beta4w) < 4.8 \quad (5a)$$

More preferably, the ranges defined by Conditional Expressions (1a) to (5a) may be set as follows:

$$-3.05 < f2/fw < -2.02 \quad (1b)$$

$$3.60 < |m2/f2| < 4.80 \quad (2b)$$

$$3.1 < \beta2t/\beta2w < 21.0 \quad (3b)$$

$$0.20 < |m3/m2| < 0.44 \quad (4b)$$

$$1.2 < (\beta3t/\beta3w) \times (\beta4t/\beta4w) < 4.6 \quad (5b)$$

Configurations of the individual lens units will now be described.

The first lens unit L1 includes a cemented lens CL1 in which a negative lens component 10n (a lens component having a negative refractive power) and a positive lens component 10p (a lens component having a positive refractive power) are cemented to each other, and a meniscus positive lens component 12 having a convex surface on the object side thereof. In each of the embodiments, the refractive power of the first lens unit L1 is increased so that the size of the zoom lens is reduced. With the increase in the refractive power of the first lens unit L1, aberrations in the first lens unit L1 become large. Particularly, spherical aberration becomes large on the telephoto side. Hence, the positive refractive power of the first lens unit L1 is shared between the cemented lens CL1 and the positive lens component 10p, whereby such aberrations are reduced.

The second lens unit L2 has a larger absolute value of the refractive power on the image side thereof than on the object side thereof and includes three separate lens components: a negative lens component 20 having a concave surface on the image side thereof, another negative lens component 22, and a positive lens component 24. In each of the embodiments, the refractive power of the second lens unit L2 is increased so that the effective diameter of the first lens unit L1 is reduced while a wide angle of view is realized at the wide-angle end.

With the increase in the refractive power of the second lens unit L2, aberrations in the second lens unit L2 become large. Particularly, field curvature and lateral chromatic aberration become large on the wide-angle side. Hence, in each of the embodiments, the negative refractive power of the second lens unit L2 is shared between the two negative lens components 20 and 22, and one of or both of the surfaces of the second one of the negative lens components 20 and 22 counted from the object side are aspherical, whereby field curvature is reduced. Furthermore, lateral chromatic aberration is reduced by using the positive lens component 24. In such a configuration, the reduction in the effective diameter of the front lens unit and high optical performance are realized with a wide angle of view.

In addition, the positive lens component 24 is made of a high-dispersion material having an Abbe number smaller than 20, whereby the refractive power of the lens component that is necessary for achromatization is reduced as much as possible. Thus, the size of the zoom lens is reduced while field curvature and lateral chromatic aberration are reduced.

The third lens unit L3 includes a positive lens component 30 having a convex surface on the object side thereof, a biconvex positive lens component 32, and a negative lens component 34 having a concave surface on the image side thereof. In each of the embodiments, the refractive power of the third lens unit L3 is increased so that the length of travel of the third lens unit L3 during zooming is reduced while the total length of the zoom lens at the wide-angle end is reduced. With the increase in the refractive power of the third lens unit L3, aberrations in the third lens unit L3 become large. Particularly, longitudinal chromatic aberration and coma aberration become large.

Hence, the refractive power of the third lens unit L3 is shared among the two positive lens components 30 and 32 and the negative lens component 34, and both surfaces of the first one of the positive lens components 30 and 32 counted from the object side are aspherical, whereby coma aberration is reduced. Furthermore, the second one of the positive lens components 30 and 32 counted from the object side is made of a low-dispersion material (having an Abbe number of 90 or larger), whereby longitudinal chromatic aberration is reduced.

The fourth lens unit L4 includes a cemented lens in which a positive lens component 40p and a negative lens component 40n are cemented to each other. In each of the embodiments, employing such a cemented lens as the fourth lens unit L4 reduces variations in lateral chromatic aberration and field curvature during zooming.

Thus, each of the embodiments employing the lens units configured as described above provides a small-sized zoom lens having a wide angle of view of 75° or larger and a high zoom ratio of 14 or larger. When the zoom lens of each of the embodiments is included in an image pickup apparatus, distortion among various aberrations may be corrected by electrical image processing.

According to each of the embodiments of the present invention, an image circle of the zoom lens at the wide-angle end is smaller than an image circle of the zoom lens at the telephoto end. This makes it easy to reduce the effective diameter of the front lens unit.

Data for exemplary Numerical Examples 1 to 6 corresponding to the first to sixth embodiments, respectively, are given below. In each of Numerical Examples 1 to 6, i is a positive integer (i≥1) and denotes the order of the surface counted from the object side, ri denotes the radius of curvature of the i-th surface, di denotes the distance between the i-th surface and the (i+1)-th surface, and ndi and vdi respectively denote the refractive index and the Abbe number of the material of the i-th optical member with respect to d-line.

In each of Numerical Examples 1 to 6, two surfaces nearest to the extreme end on the image side correspond to surfaces of the optical block. BF denotes back focal length corresponding to the distance from the last lens surface to the image plane that is calculated through air conversion. The shape of each aspherical surface, which is denoted as X, is calculated from the displacement in the optical-axis direction at a height H from the optical axis with reference to the vertex of that surface and is expressed as follows:

$$X = \frac{H^2/R}{1+\sqrt{1-(1+k)(H/R)^2}} + A4H^4 + A6H^6 + A8H^8 + A10H^{10} + A12H^{12}$$

where the direction in which light travels is considered positive; R denotes a paraxial radius of curvature; k denotes a conic constant; and A4, A6, A8, A10, and A12 denote the coefficients of the aspherical surface. Surfaces with asterisks (*) have aspherical shapes. The mathematical expression "e-x" is equivalent to the exponential notation "$10^{-x}$". Table 1 summarizes the relationships between Conditional Expressions (1) to (5) given above and values in Numerical Examples 1 to 6.

NUMBERICAL EXAMPLE 1

| Unit: mm | | | | |
|---|---|---|---|---|
| Data on surfaces | | | | |
| Surface number | r | d | nd | vd |
| 1 | 54.780 | 1.00 | 1.85478 | 24.8 |
| 2 | 21.684 | 3.88 | 1.59522 | 67.7 |
| 3 | −673.059 | 0.13 | | |
| 4 | 23.115 | 2.30 | 1.88300 | 40.8 |
| 5 | 79.559 | (Variable) | | |
| 6 | 596.811 | 0.45 | 2.00100 | 29.1 |
| 7 | 4.641 | 2.92 | | |
| 8* | −9.580 | 0.60 | 1.85135 | 40.1 |
| 9* | −876.262 | 0.24 | | |
| 10 | 109.709 | 1.65 | 1.95906 | 17.5 |
| 11 | −12.462 | (Variable) | | |
| 12 (Stop) | ∞ | (Variable) | | |
| 13* | 11.067 | 1.88 | 1.76802 | 49.2 |
| 14* | −551.571 | 0.14 | | |
| 15 | 9.804 | 3.78 | 1.43875 | 94.9 |
| 16 | −9.740 | 0.13 | | |
| 17 | 23.507 | 0.42 | 2.00100 | 29.1 |
| 18 | 5.410 | (Variable) | | |
| 19 | 9.177 | 3.66 | 1.48749 | 70.2 |
| 20 | −13.006 | 0.42 | 2.00069 | 25.5 |
| 21 | −19.696 | (Variable) | | |
| 22 | ∞ | 1.78 | 1.51633 | 64.1 |
| 23 | ∞ | 1.34 | | |
| Image plane | ∞ | | | |

| Data on aspherical surfaces |
|---|
| 8th surface |

K = −8.17469e+000   A4 = −9.69765e−004   A6 = 6.39740e−006
A8 = −1.97567e−006

| 9th surface |
|---|

K = 4.64241e+004   A4 = −2.70529e−004   A6 = −3.02651e−005
A8 = −1.02953e−007

| 13th surface |
|---|

K = −1.08675e+000   A4 = 5.93204e−005   A6 = −6.20605e−006
A8 = 2.62107e−007   A10 = −3.38035e−008   A12 = 7.22418e−010

-continued

Unit: mm

14th surface

K = −6.57481e+004    A4 = 3.22971e−004    A6 = 1.14963e−006
A8 = 3.75177e−009    A10 = −2.56536e−008    A12 = 8.07604e−010

Other data
Zoom ratio 24.59

|  | Wide angle | Intermediate | Telephoto |
|---|---|---|---|
| Focal length | 2.57 | 12.72 | 63.23 |
| F-number | 1.85 | 2.84 | 3.50 |
| Angle of view | 38.22 | 10.03 | 2.04 |
| Total lens length | 65.34 | 65.34 | 65.34 |
| Back focal length | 6.36 | 10.85 | 7.15 |
| d5 | 0.72 | 13.85 | 22.60 |
| d11 | 23.21 | 10.08 | 1.33 |
| d12 | 8.64 | 1.45 | 1.45 |
| d18 | 2.80 | 5.50 | 9.20 |
| d21 | 3.84 | 8.33 | 4.63 |

Data on lens units

| Unit | First surface number | Focal length |
|---|---|---|
| 1 | 1 | 31.46 |
| 2 | 6 | −5.62 |
| 3 | 13 | 16.64 |
| 4 | 19 | 15.93 |

NUMBERICAL EXAMPLE 2

Unit: mm

Data on surfaces

| Surface number | r | d | nd | νd |
|---|---|---|---|---|
| 1 | 64.949 | 1.10 | 1.85478 | 24.8 |
| 2 | 23.385 | 4.01 | 1.59522 | 67.7 |
| 3 | −309.884 | 0.13 | | |
| 4 | 24.302 | 2.34 | 1.88300 | 40.8 |
| 5 | 85.758 | (Variable) | | |
| 6 | 843.739 | 0.45 | 2.00100 | 29.1 |
| 7 | 5.509 | 2.80 | | |
| 8 | −9.280 | 0.60 | 1.85135 | 40.1 |
| 9* | 35.265 | 0.32 | | |
| 10 | 27.948 | 1.79 | 1.95906 | 17.5 |
| 11 | −15.904 | (Variable) | | |
| 12 (Stop) | ∞ | (Variable) | | |
| 13* | 14.883 | 1.79 | 1.69350 | 53.2 |
| 14* | −7872.868 | 1.70 | | |
| 15 | 17.400 | 3.73 | 1.43875 | 94.9 |
| 16 | −12.100 | 0.12 | | |
| 17 | 18.586 | 0.60 | 2.00100 | 29.1 |
| 18 | 8.307 | (Variable) | | |
| 19 | 11.724 | 5.05 | 1.49700 | 81.5 |
| 20 | −10.828 | 0.60 | 1.85478 | 24.8 |
| 21 | −19.206 | (Variable) | | |
| 22 | ∞ | 1.78 | 1.51633 | 64.1 |
| 23 | ∞ | 1.33 | | |
| Image plane | ∞ | | | |

Data on aspherical surfaces

9th surface

K = 1.52152e+001    A4 = −2.63889e−004    A6 = 2.74803e−006
A8 = 5.16564e−008    A10 = −4.81128e−009

-continued

Unit: mm

13th surface

K = 1.07717e+000    A4 = 3.01455e−005    A6 = −1.12904e−006
A8 = −1.89900e−008

14th surface

K = −9.21904e+007    A4 = 3.04795e−004

Other data
Zoom ratio 24.61

|  | Wide angle | Intermediate | Telephoto |
|---|---|---|---|
| Focal length | 2.57 | 12.89 | 63.23 |
| F-number | 1.85 | 2.84 | 3.50 |
| Angle of view | 37.62 | 9.90 | 2.04 |
| Total lens length | 74.45 | 74.45 | 74.45 |
| Back focal length | 6.95 | 12.18 | 9.33 |
| d5 | 0.72 | 14.50 | 23.69 |
| d11 | 24.30 | 10.52 | 1.33 |
| d12 | 11.06 | 1.70 | 2.35 |
| d18 | 4.27 | 8.41 | 10.61 |
| d21 | 4.45 | 9.67 | 6.83 |

Data on lens units

| Unit | First surface number | Focal length |
|---|---|---|
| 1 | 1 | 33.08 |
| 2 | 6 | −5.62 |
| 3 | 13 | 18.84 |
| 4 | 19 | 19.23 |

NUMBERICAL EXAMPLE 3

Unit: mm

Data on surfaces

| Surface number | r | d | nd | νd |
|---|---|---|---|---|
| 1 | 50.425 | 1.00 | 1.85478 | 24.8 |
| 2 | 19.813 | 3.79 | 1.69680 | 55.5 |
| 3 | 241.024 | 0.13 | | |
| 4 | 23.813 | 2.17 | 1.88300 | 40.8 |
| 5 | 76.542 | (Variable) | | |
| 6 | 304.789 | 0.45 | 2.00100 | 29.1 |
| 7 | 4.951 | 2.91 | | |
| 8* | −9.062 | 0.60 | 1.85135 | 40.1 |
| 9* | −1258.293 | 0.51 | | |
| 10 | 84.514 | 1.59 | 1.95906 | 17.5 |
| 11 | −13.554 | (Variable) | | |
| 12 (Stop) | ∞ | (Variable) | | |
| 13* | 12.172 | 1.62 | 1.76802 | 49.2 |
| 14* | −676.959 | 0.32 | | |
| 15 | 10.328 | 3.80 | 1.43875 | 94.9 |
| 16 | −8.662 | 0.20 | | |
| 17 | 20.744 | 0.42 | 2.00100 | 29.1 |
| 18 | 5.503 | (Variable) | | |
| 19 | 9.336 | 3.93 | 1.48749 | 70.2 |
| 20 | −13.060 | 0.42 | 2.00069 | 25.5 |
| 21 | −18.897 | (Variable) | | |
| 22 | ∞ | 1.78 | 1.51633 | 64.1 |
| 23 | ∞ | 1.34 | | |
| Image plane | ∞ | | | |

Data on aspherical surfaces

8th surface

K = −5.46613e+000    A4 = −5.23156e−004    A6 = −8.59247e−006
A8 = −8.33187e−007

-continued

Unit: mm

9th surface

K = 9.54097e+004    A4 = −5.19517e−007    A6 = −2.90776e−005
A8 = 2.12957e−007

13th surface

K = −1.14852e+000   A4 = 5.13310e−005     A6 = −8.94412e−006
A8 = 2.58607e−007   A10 = −3.41631e−008   A12 = 4.86441e−010

14th surface

K = −1.98954e+005   A4 = 3.61152e−004     A6 = 1.49974e−006
A8 = 3.75177e−009   A10 = −2.86495e−008   A12 = 7.61602e−010

Other data
Zoom ratio 20.02

|  | Wide angle | Intermediate | Telephoto |
|---|---|---|---|
| Focal length | 2.57 | 12.22 | 51.45 |
| F-number | 1.85 | 2.42 | 3.20 |
| Angle of view | 38.23 | 10.43 | 2.50 |
| Total lens length | 64.83 | 64.83 | 64.83 |
| Back focal length | 6.33 | 10.34 | 8.72 |
| d5 | 0.72 | 13.31 | 21.70 |
| d11 | 22.31 | 9.72 | 1.33 |
| d12 | 9.20 | 1.45 | 1.45 |
| d18 | 2.40 | 6.14 | 7.76 |
| d21 | 3.82 | 7.82 | 6.21 |

Data on lens units

| Unit | First surface number | Focal length |
|---|---|---|
| 1 | 1 | 31.67 |
| 2 | 6 | −5.75 |
| 3 | 13 | 16.82 |
| 4 | 19 | 15.68 |

-continued

Unit: mm

Data on aspherical surfaces

9th surface

K = 1.30811e+001    A4 = −2.87533e−004    A6 = 2.81606e−006
A8 = −1.78421e−008  A10 = −4.34438e−009

13th surface

K = 1.12830e+000    A4 = 1.11109e−004     A6 = −1.78002e−006
A8 = −6.37095e−008

14th surface

K = 2.25675e+004    A4 = 4.20650e−004

Other data
Zoom ratio 30.34

|  | Wide angle | Intermediate | Telephoto |
|---|---|---|---|
| Focal length | 2.54 | 13.61 | 77.10 |
| F-number | 1.85 | 3.26 | 4.20 |
| Angle of view | 37.93 | 9.39 | 1.67 |
| Total lens length | 77.18 | 77.18 | 77.18 |
| Back focal length | 7.23 | 13.94 | 10.21 |
| d5 | 0.72 | 15.48 | 25.31 |
| d11 | 25.92 | 11.17 | 1.33 |
| d12 | 11.61 | 1.70 | 2.28 |
| d18 | 5.10 | 8.31 | 11.46 |
| d21 | 4.77 | 11.48 | 7.75 |

Data on lens units

| Unit | First surface number | Focal length |
|---|---|---|
| 1 | 1 | 34.34 |
| 2 | 6 | −5.43 |
| 3 | 13 | 19.46 |
| 4 | 19 | 19.57 |

NUMBERICAL EXAMPLE 4

Unit: mm

Data on surfaces

| Surface number | r | d | nd | vd |
|---|---|---|---|---|
| 1 | 62.047 | 1.10 | 1.85478 | 24.8 |
| 2 | 23.495 | 3.92 | 1.59522 | 67.7 |
| 3 | −553.960 | 0.13 |  |  |
| 4 | 25.026 | 2.30 | 1.88300 | 40.8 |
| 5 | 87.199 | (Variable) |  |  |
| 6 | 402.012 | 0.45 | 2.00100 | 29.1 |
| 7 | 5.166 | 2.85 |  |  |
| 8 | −9.280 | 0.60 | 1.85135 | 40.1 |
| 9* | 34.473 | 0.12 |  |  |
| 10 | 23.900 | 1.88 | 1.95906 | 17.5 |
| 11 | −15.756 | (Variable) |  |  |
| 12 (Stop) | ∞ | (Variable) |  |  |
| 13* | 18.235 | 1.75 | 1.69350 | 53.2 |
| 14* | 811.352 | 0.37 |  |  |
| 15 | 11.492 | 4.60 | 1.43875 | 94.9 |
| 16 | −10.290 | 0.34 |  |  |
| 17 | 28.318 | 0.60 | 1.91082 | 35.3 |
| 18 | 7.835 | (Variable) |  |  |
| 19 | 11.999 | 4.97 | 1.49700 | 81.5 |
| 20 | −11.462 | 0.60 | 1.85478 | 24.8 |
| 21 | −20.034 | (Variable) |  |  |
| 22 | ∞ | 1.78 | 1.51633 | 64.1 |
| 23 | ∞ | 1.28 |  |  |
| Image plane | ∞ |  |  |  |

NUMBERICAL EXAMPLE 5

Unit: mm

Data on surfaces

| Surface number | r | d | nd | vd |
|---|---|---|---|---|
| 1 | 84.735 | 1.00 | 1.85478 | 24.8 |
| 2 | 25.832 | 4.71 | 1.69680 | 55.5 |
| 3 | −496.829 | 0.13 |  |  |
| 4 | 25.491 | 2.47 | 1.88300 | 40.8 |
| 5 | 64.574 | (Variable) |  |  |
| 6 | 156.973 | 0.45 | 2.00100 | 29.1 |
| 7 | 4.975 | 3.24 |  |  |
| 8* | −9.339 | 0.60 | 1.85135 | 40.1 |
| 9* | −875.305 | 0.79 |  |  |
| 10 | 65.981 | 1.73 | 1.95906 | 17.5 |
| 11 | −15.324 | (Variable) |  |  |
| 12 (Stop) | ∞ | (Variable) |  |  |
| 13* | 12.919 | 1.64 | 1.76802 | 49.2 |
| 14* | −585.964 | 0.13 |  |  |
| 15 | 11.066 | 4.18 | 1.43875 | 94.9 |
| 16 | −8.948 | 0.74 |  |  |
| 17 | 25.279 | 0.45 | 2.00100 | 29.1 |
| 18 | 5.516 | (Variable) |  |  |
| 19 | 8.920 | 3.69 | 1.48749 | 70.2 |
| 20 | −13.122 | 1.20 | 1.95906 | 17.5 |
| 21 | −18.401 | (Variable) |  |  |
| 22 | ∞ | 1.78 | 1.51633 | 64.1 |
| 23 | ∞ | 1.33 |  |  |
| Image plane | ∞ |  |  |  |

-continued

Unit: mm

Data on aspherical surfaces

8th surface

K = −4.69634e+000   A4 = 1.79239e−004   A6 = −1.09322e−005
A8 = −4.34941e−007

9th surface

K = 3.93088e+004   A4 = 4.84303e−004   A6 = −2.94207e−005
A8 = −2.81379e−008

13th surface

K = −5.08216e−001   A4 = 5.36237e−005   A6 = −6.90697e−006
A8 = 2.94664e−007   A10 = −4.00303e−008   A12 = 7.33723e−010

14th surface

K = −1.09100e+005   A4 = 3.61449e−004   A6 = 1.79980e−006
A8 = 3.75177e−009   A10 = −3.05411e−008   A12 = 7.95611e−010

Other data
Zoom ratio 20.03

|  | Wide angle | Intermediate | Telephoto |
|---|---|---|---|
| Focal length | 2.35 | 11.05 | 47.10 |
| F-number | 1.85 | 2.42 | 2.80 |
| Angle of view | 40.74 | 11.51 | 2.74 |
| Total lens length | 71.71 | 71.71 | 71.71 |
| Back focal length | 5.90 | 10.23 | 12.10 |
| d5 | 0.72 | 15.73 | 25.73 |
| d11 | 26.34 | 11.34 | 1.33 |
| d12 | 9.62 | 1.45 | 1.45 |
| d18 | 1.98 | 5.81 | 3.95 |
| d21 | 3.40 | 7.73 | 9.59 |

Data on lens units

| Unit | First surface number | Focal length |
|---|---|---|
| 1 | 1 | 37.46 |
| 2 | 6 | −5.92 |
| 3 | 13 | 17.55 |
| 4 | 19 | 14.73 |

NUMBERICAL EXAMPLE 6

Unit: mm

Data on surfaces

| Surface number | r | d | nd | νd |
|---|---|---|---|---|
| 1 | 45.920 | 1.00 | 1.94595 | 18.0 |
| 2 | 30.447 | 4.51 | 1.69680 | 55.5 |
| 3 | 153.225 | 0.13 |  |  |
| 4 | 25.373 | 2.20 | 1.88300 | 40.8 |
| 5 | 41.761 | (Variable) |  |  |
| 6 | 54.134 | 0.45 | 2.00100 | 29.1 |
| 7 | 5.090 | 3.85 |  |  |
| 8* | −8.840 | 0.60 | 1.85135 | 40.1 |
| 9* | −927.182 | 1.49 |  |  |
| 10 | 70.033 | 1.73 | 1.95906 | 17.5 |
| 11 | −18.023 | (Variable) |  |  |
| 12 (Stop) | ∞ | (Variable) |  |  |
| 13* | 13.544 | 1.61 | 1.76802 | 49.2 |
| 14* | −961.111 | 0.13 |  |  |
| 15 | 11.172 | 4.16 | 1.43875 | 94.9 |
| 16 | −8.922 | 0.39 |  |  |
| 17 | 21.598 | 0.43 | 2.00100 | 29.1 |
| 18 | 5.949 | (Variable) |  |  |
| 19 | 9.367 | 3.66 | 1.48749 | 70.2 |
| 20 | −12.603 | 1.20 | 1.95906 | 17.5 |
| 21 | −19.215 | (Variable) |  |  |
| 22 | ∞ | 1.78 | 1.51633 | 64.1 |
| 23 | ∞ | 1.29 |  |  |
| Image plane | ∞ |  |  |  |

Data on aspherical surfaces

8th surface

K = −3.35427e+000   A4 = 1.04366e−003   A6 = −9.80272e−006
A8 = −6.41855e−007

9th surface

K = 3.46720e+004   A4 = 1.19208e−003   A6 = −3.06970e−005
A8 = −2.94570e−007

13th surface

K = −1.70635e−001   A4 = 3.51156e−005   A6 = −6.27968e−006
A8 = 3.56525e−007   A10 = −4.34213e−008   A12 = 8.40952e−010

14th surface

K = −3.72107e+005   A4 = 3.85696e−004   A6 = 2.33089e−006
A8 = 3.75177e−009   A10 = −3.00326e−008   A12 = 8.24579e−010

Other data
Zoom ratio 14.97

|  | Wide angle | Intermediate | Telephoto |
|---|---|---|---|
| Focal length | 2.04 | 8.99 | 30.51 |
| F-number | 1.85 | 2.42 | 2.80 |
| Angle of view | 44.82 | 14.05 | 4.22 |
| Total lens length | 74.53 | 74.53 | 74.53 |
| Back focal length | 5.94 | 9.22 | 14.19 |
| d5 | 0.72 | 16.53 | 27.07 |
| d11 | 27.68 | 11.87 | 1.33 |
| d12 | 10.75 | 1.47 | 1.45 |
| d18 | 1.90 | 7.89 | 2.95 |
| d21 | 3.47 | 6.76 | 11.72 |

Data on lens units

| Unit | First surface number | Focal length |
|---|---|---|
| 1 | 1 | 45.00 |
| 2 | 6 | −5.89 |
| 3 | 13 | 17.40 |
| 4 | 19 | 16.04 |

TABLE 1

| Conditional Expression | Numerical Example 1 | Numerical Example 2 | Numerical Example 3 | Numerical Example 4 | Numerical Example 5 | Numerical Example 6 |
|---|---|---|---|---|---|---|
| (1) f2/fw | −2.18 | −2.19 | −2.24 | −2.14 | −2.52 | −2.89 |
| (2) \|m2/f2\| | 3.89 | 4.08 | 3.65 | 4.53 | 4.23 | 4.47 |
| (3) β2t/β2w | 14.79 | 13.25 | 10.46 | 16.21 | 7.58 | 4.18 |
| (4) \|m3/m2\| | 0.33 | 0.38 | 0.37 | 0.38 | 0.33 | 0.35 |
| (5) (β3t/β3w) × (β4t/β4w) | 1.66 | 1.86 | 1.91 | 1.87 | 2.64 | 3.58 |

An embodiment as an image pickup apparatus (video camera) in which the zoom lens according to any of the above embodiments of the present invention is used as an image taking optical system will now be described with reference to FIG. 13.

The image pickup apparatus illustrated in FIG. 13 includes a video camera body 10, an image taking optical system 11, which corresponds to the zoom lens according to any of the first to sixth embodiments, a solid-state image pickup device 12 such as a CCD sensor or a CMOS sensor that is provided in the video camera body 10 and receives an image of an object that is formed through the image taking optical system 11, a memory 13 that stores information obtained through photoelectric conversion of the image of the object performed by the solid-state image pickup device 12, and an electric view finder 14 through which the image of the object obtained through photoelectric conversion by the solid-state image pickup device 12 is observed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-098676 filed Apr. 24, 2012, which is hereby incorporated by reference herein in its entirety.

What is claimed is:

1. A zoom lens comprising, in order from an object side toward an image side:
   a first lens unit having a positive refractive power;
   a second lens unit having a negative refractive power;
   a third lens unit having a positive refractive power; and
   a fourth lens unit having a positive refractive power,
   wherein the second lens unit, the third lens unit, and the fourth lens unit are moved during zooming,
   wherein a position of the third lens unit at a telephoto end is closer to the object side than a position of the third lens unit at a wide-angle end, and
   wherein the zoom lens satisfies the following conditional expressions:

$-3.2 < f2/fw < -2.0$ $3.5 < |m2/f2| < 5.1$ $1.0 < (\beta 3t/\beta 3w) \times (\beta 4t/\beta 4w) < 5.0$ where fw denotes a focal length of the zoom lens at the wide-angle end, m2 denotes a difference with respect to an image plane in positions of the second lens unit on an optical axis between that at the wide-angle end and that at the telephoto end, f2 denotes a focal length of the second lens unit, $\beta 3w$ and $\beta 3t$ denote lateral magnifications of the third lens unit at the wide-angle end and at the telephoto end, respectively, and $\beta 4w$ and $\beta 4t$ denote lateral magnifications of the fourth lens unit at the wide-angle end and at the telephoto end, respectively.

2. The zoom lens according to claim 1, further satisfying the following conditional expression:

$2.5 < \beta 2t/\beta 2w < 25.0$ where $\beta 2w$ denotes lateral magnification of the second lens unit at the wide-angle end and $\beta 2t$ denotes lateral magnification of the second lens unit at the telephoto end.

3. The zoom lens according to claim 1, further satisfying the following conditional expression:

$0.1 < |m3/m2| < 0.5$ where m3 denotes a difference with respect to the image plane in positions of the third lens unit on the optical axis between that at the wide-angle end and that at the telephoto end.

4. The zoom lens according to claim 1, wherein an image formed by the zoom lens is moved in a direction perpendicular to the optical axis by moving the entirety or part of the third lens unit in a direction nonparallel to the optical axis.

5. The zoom lens according to claim 1, wherein the second lens unit includes, in order from the object side toward the image side, a negative lens component, another negative lens component, and a positive lens component.

6. The zoom lens according to claim 1, wherein the third lens unit includes, in order from the object side toward the image side, a positive lens component, another positive lens component, and a negative lens component.

7. The zoom lens according to claim 1, wherein an image circle of the zoom lens at the wide-angle end is smaller than an image circle of the zoom lens at the telephoto end.

8. An image pickup apparatus comprising:
   a zoom lens; and
   an image pickup device that receives an image formed by the zoom lens, wherein the zoom lens comprises in order from an object side toward an image side:
   a first lens unit having a positive refractive power;
   a second lens unit having a negative refractive power;
   a third lens unit having a positive refractive power; and
   a fourth lens unit having a positive refractive power,
   wherein the second lens unit, the third lens unit, and the fourth lens unit are moved during zooming,
   wherein a position of the third lens unit at a telephoto end is closer to the object side than a position of the third lens unit at a wide-angle end, and
   wherein the zoom lens satisfies the following conditional expressions:

$-3.2 < f2/fw < -2.0$ $3.5 < |m2/f2| < 5.1$ $1.0 < (\beta 3t/\beta 3w) \times (\beta 4t/\beta 4w) < 5.0$ where fw denotes a focal length of the zoom lens at the wide-angle end, m2 denotes a difference with respect to an image plane in positions of the second lens unit on an optical axis between that at the wide-angle end and that at the telephoto end, f2 denotes a focal length of the second lens unit, $\beta 3w$ and $\beta 3t$ denote lateral magnifications of the third lens unit at the wide-angle end and at the telephoto end, respectively, and $\beta 4w$ and $\beta 4t$ denote lateral magnifications of the fourth lens unit at the wide-angle end and at the telephoto end, respectively.

* * * * *